US010813031B2

(12) United States Patent
Mendiola et al.

(10) Patent No.: US 10,813,031 B2
(45) Date of Patent: Oct. 20, 2020

(54) SYSTEM AND METHOD FOR RELAYING INFORMATION

(71) Applicant: VOXP PTE LTD, Singapore (SG)

(72) Inventors: Maria Anna Victoria Beltran Mendiola, New York, NY (US); Melvin Ryan Lopez Fetalvero, Quezon (PH); Dennis Beltran Mendiola, New York, NY (US)

(73) Assignee: VOX PTE LTD, Singapore (SG)

(*) Notice: Subject to any disclaimer, the term of this patent is extended or adjusted under 35 U.S.C. 154(b) by 223 days.

(21) Appl. No.: 15/747,143

(22) PCT Filed: Jul. 25, 2016

(86) PCT No.: PCT/SG2016/050348
§ 371 (c)(1),
(2) Date: Jan. 23, 2018

(87) PCT Pub. No.: WO2017/018936
PCT Pub. Date: Feb. 2, 2017

(65) Prior Publication Data
US 2018/0220353 A1    Aug. 2, 2018

(30) Foreign Application Priority Data

Jul. 24, 2015  (SG) .......................... 10201505804T
Jan. 15, 2016  (SG) .......................... 10201600333U

(51) Int. Cl.
*H04W 40/22*    (2009.01)
*H04W 88/04*    (2009.01)
(Continued)

(52) U.S. Cl.
CPC .............. *H04W 40/22* (2013.01); *H04B 7/15* (2013.01); *H04W 4/80* (2018.02); *H04W 24/02* (2013.01); *H04W 88/04* (2013.01)

(58) Field of Classification Search
CPC ..................................................... H04W 40/22
See application file for complete search history.

(56) References Cited

U.S. PATENT DOCUMENTS 7,421,257 B1    9/2008  Elliott
7,626,966 B1   12/2009  Ruiter et al.
(Continued)

OTHER PUBLICATIONS

Xian Wu et al., 'Emergency Message Dissemination System for Smartphones During Natural Disasters', 11th International Conference on ITS Telecommunications, University of Twente, the Netherlands, dated 2011 See whole document.
(Continued)

*Primary Examiner* — Andrew Lai
*Assistant Examiner* — Andrew C Lee
(74) *Attorney, Agent, or Firm* — JCIP; Joseph G. Chu; Jeremy I. Maynard

(57) ABSTRACT

A system for relaying information comprising a plurality of communication devices, each communication device having means to transmit, receive and store relay information; a server operable to receive relay information and synchronize relay information when a connection between each communication device and the server is established; wherein at least one communication device is operable to broadcast relay information for asynchronous exchange of relay information when another communication device is within vicinity of at least one communication device.

20 Claims, 17 Drawing Sheets

(51) Int. Cl.
*H04B 7/15* (2006.01)
*H04W 4/80* (2018.01)
*H04W 24/02* (2009.01)

(56) References Cited

U.S. PATENT DOCUMENTS

| | | | | |
|---|---|---|---|---|
| 8,750,123 | B1* | 6/2014 | Alisawi | H04W 28/0284 370/235 |
| 2002/0044042 | A1 | 4/2002 | Christensen et al. | |
| 2002/0198780 | A1* | 12/2002 | Kawakami | G06Q 30/0264 705/14.61 |
| 2007/0010248 | A1* | 1/2007 | Dravida | H04W 84/18 455/435.1 |
| 2007/0010261 | A1* | 1/2007 | Dravida | G01S 5/0009 455/456.3 |
| 2007/0203717 | A1* | 8/2007 | Hutchison | G06Q 99/00 379/111 |
| 2008/0056144 | A1* | 3/2008 | Hutchinson | H04M 15/58 370/250 |
| 2008/0159207 | A1 | 7/2008 | Levine et al. | |
| 2008/0258880 | A1* | 10/2008 | Smith | H04L 67/125 340/286.02 |
| 2009/0073924 | A1 | 3/2009 | Chou | |
| 2009/0109870 | A1 | 4/2009 | Metke et al. | |
| 2009/0170557 | A1* | 7/2009 | Chauhan | H04W 36/14 455/552.1 |
| 2009/0239466 | A1 | 9/2009 | Saitou et al. | |
| 2009/0245159 | A1 | 10/2009 | Oyman et al. | |
| 2010/0015926 | A1* | 1/2010 | Luff | H04L 41/0686 455/67.13 |
| 2010/0142446 | A1* | 6/2010 | Schlicht | H04W 28/021 370/328 |
| 2010/0150120 | A1* | 6/2010 | Schlicht | H04W 4/23 370/338 |
| 2010/0279647 | A1 | 11/2010 | Jacobs et al. | |
| 2010/0303080 | A1* | 12/2010 | Srivastava | H04L 41/12 370/400 |
| 2012/0078804 | A1* | 3/2012 | Scarborough | G06Q 30/08 705/321 |
| 2013/0036231 | A1* | 2/2013 | Suumaki | H04W 12/003 709/228 |
| 2013/0094398 | A1 | 4/2013 | Das et al. | |
| 2013/0235758 | A1 | 9/2013 | Delmas et al. | |
| 2013/0309971 | A1* | 11/2013 | Kiukkonen | H04W 12/003 455/41.2 |
| 2014/0075523 | A1* | 3/2014 | Tuomaala | H04W 12/003 726/6 |
| 2014/0244712 | A1* | 8/2014 | Walters | G06F 3/167 709/202 |
| 2015/0135012 | A1* | 5/2015 | Bhalla | H04L 41/147 714/26 |
| 2015/0237104 | A1* | 8/2015 | Oguchi | H04L 69/16 709/231 |
| 2015/0244580 | A1* | 8/2015 | Saavedra | H04L 45/245 709/221 |
| 2016/0013991 | A1* | 1/2016 | Parker | H04M 15/58 705/7.33 |
| 2018/0060135 | A1* | 3/2018 | Lacey | G06F 9/5077 |

OTHER PUBLICATIONS

Hiroki Nishiyama et al., 'Relay-by-Smartphone: Realizing Multihop Device-to-Device Communications', IEEE Communications Magazine, dated Apr. 2014 See whole document.

Yao-Chung Chang et al., 'Cluster Based Self-Organization Management Protocols for Wireless Sensor Networks', IEEE Transactions on Consumer Electronics, vol. 52, No. 1, dated Feb. 2006 See whole document.

International Search Report; Second Written Opinion by IPEA; Written Opinion by ISA; International Report on Patentability of International Application PCT/SG2016/050348.

* cited by examiner

| FACTOR (Index) | WEIGHT |
|---|---|
| Frequency of Internet connectivity (from 1 to 100) | 35% |
| Success rate in being part of a chain that delivered a message (from 1 to 100) | 30% |
| Size of message Cache (from 1 to 100) | 20% |
| Average Network Scores of agents typically in proximity (from 1 to 100) | 15% |
| TOTAL | 100% |

| FACTOR' (Index)' | Index' | Weight' | |
|---|---|---|---|
| Frequency of Internet connectivity (from 1 to 100) | 50 | 35% | 17.5 |
| Success rate in being part of a chain that delivered a message (from 1 to 100) | 50 | 30% | 15.0 |
| Size of message Cache (from 1 to 100) | 50 | 20% | 10.0 |
| Average Network Scores of agents typically in proximity (from 1 to 100) | 50 | 15% | 7.5 |
| (INITIAL) NETWORK'SCORE' | | 100% | 50' |

Fig. 4

SYSTEM AND METHOD FOR RELAYING INFORMATION

FIELD OF THE INVENTION

The present invention relates to a system and method for relaying information. In particular, the system and method is suited for relaying information where conventional network coverage is not reliable or available.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

With the advent of technology, network providers such as telecommunications carriers are able to provide services such as fixed and/or mobile voice or data services at a lower cost. Examples of such services include fixed and mobile broadband data. These lower costs have facilitated the increasing connectivity between people in part (the other part owes largely to the proliferation of Internet-capable devices, also due to lower costs).

However, many remote or relatively inaccessible areas of the world are still not connected and lack basic communications, be it in the form of telephone lines or 2G mobile data. These areas lack the coverage of network providers.

Moreover, when natural or man-made disasters strike, the communication infrastructure associated with network providers such as network lines and base stations may be destroyed, causing disruption. This is exacerbated by the need to communicate urgently for help or disaster relief efforts.

In light of the above, there exists a need to improve connectivity between people, in particular in situations of natural disaster or where telecommunications services are disrupted or non-existent.

SUMMARY OF THE INVENTION

Throughout the document, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The invention is motivated by harnessing the capability of communication devices such as mobile devices/smartphones as network nodes to form a relay chain for the delivery of information such as, but not limited to data packets, multimedia messages, videos, audio files, etc.

In accordance with an aspect of the invention there is a system for relaying information comprising a plurality of communication devices, each communication device having the capability to transmit, receive and store information for relay to another communication device; each communication device assigned a network score; and a server operable to update the network score assigned to each communication device when a connection between the communication device and server is established; wherein the network score for each communication device is a measure of the reliability and effectiveness of the communication device in relaying information relative to other communication devices.

Preferably where a connection between the communication device and the server is not established, the communication device is configured to update its network score.

Preferably, the network score of the communication device is updated based on one or more of the following data analytics: a quantitative measure; a heuristic measure; a predictive method; and a prescriptive method.

Preferably, the data analytics include big data analytics.

Preferably, the at least one communication device is a mobile device.

Preferably, the means to transmit, receive and store information for relay comprises wireless personal area network (WPAN) technology.

Preferably the WPAN technology is Bluetooth LE.

Preferably the WPAN technology is Wi-Fi Aware.

Preferably, the network score is assigned or updated based on a combination of two or more of a factor associated a hardware capability of the communication device; a factor associated with the environment of the communication device; and a factor associated with the network score of at least one other communication device within the proximity.

Preferably, the combination of factors include two or more of the following factors: frequency of connection between the communication device and the server; success rate in being part of a relay chain to deliver relay information; size of the buffer holding information in transition; average network scores of other communication devices within the proximity of the communication device.

Preferably, the server is operable to relay the information to at least one communication device.

Preferably, there comprises a plurality of other communication devices ready to receive relay information; the communication device is configured to relay information to the other communication device having the highest network score.

Preferably, where there comprises a plurality of communication devices ready to transmit relay information, the other communication device is configured to receive information from the communication device having the highest network score.

Preferably, each communication device is configured to relay information to a plurality of other communication devices regardless of network score of the communication device.

Preferably, the plurality of communication devices is grouped into a plurality of different channels for transmitting or receiving relay information based on their respective network scores.

Preferably, the plurality of different channels comprises Bluetooth LE channels and Wi-Fi channels.

Preferably, there comprises a communication device selected from amongst the plurality of communication devices to facilitate the grouping. The communication device selected to facilitate the grouping may have the most quality connections, meets minimum requirements for computing power and data storage, or has the highest visibility of the other communication devices within a predetermined region.

Preferably, when a connection between the server and a communication device is established, the communication device is configured as a proxy for other communication devices to establish connection to the server.

Preferably, the communication device configured as the proxy provides the necessary details for the other communication devices to connect to the server or to other communication devices in proximity through said communication device.

Preferably, any new communication device joining the system is assigned a default network score.

Preferably, the network score of at least one of the plurality of communication devices may be derived based on a weighted sum of the two or more factors.

In accordance with another aspect of the invention there is a method for relaying information using a relay chain formed by a plurality of communication devices, each communication device having means to transmit, receive and store relay information to at least one other communication device; each communication device further assigned a network score comprising the steps of receiving relay information from a communication device; determining a next communication device to transmit the relay information to based on comparing the network score between at least two other communication devices; concurrently checking if connection between the communication device and a server is established; where if a connection with the server is established, transmitting the relay information to the server; wherein the network score for each communication device is a measure of the reliability and effectiveness of the communication device in relaying information relative to other communication devices, and where a connection with the server is established, the communication device is operable to transmit the relay information to the server.

Preferably, the method further comprises the step of updating the network score of the communication device if connection between the communication device and the server is established.

Preferably, the network score of the communication device is updated based on one or more of the following data analytics methods: a quantitative measure; a heuristic measure; a predictive method; and a prescriptive method.

Preferably, the network score is updated based on big data analytics.

Preferably, at least one of the plurality of communication devices is a mobile device.

Preferably, the means to transmit, receive and store relay information comprises wireless personal area network (WPAN) technology. Preferably, the WPAN technology is Bluetooth LE or Wi-Fi Aware.

Preferably, the network score is assigned or updated based on a combination of two or more of the following factors: a factor associated a hardware capability of the communication device; a factor associated with the environment of the communication device; and a factor associated with the network score of at least one other communication devices within proximity.

Preferably, the step of updating or assigning the network score is based on a combination of two or more of the following factors: frequency of connection between the communication device and the server; success rate in being part of a relay chain to deliver relay information; size of the buffer holding information in transition; average network scores of other communication devices within the proximity of the communication device.

Preferably, the server is operable to send the relay information to at least one communication device.

Preferably, the step of determining the next communication device to transmit the relay information to is based on the communication device having the highest network score.

Preferably, the method comprises the step of grouping the plurality of communication devices into a plurality of different channels based on their respective network scores. The plurality of different channels may comprise Bluetooth LE channels and Wi-Fi channels. The method may further comprise the step of selecting a communication device from amongst the plurality of communication devices to facilitate the grouping. Preferably, the communication device selected to facilitate the grouping has the most quality connections, meets minimum specifications for computing power and data storage, or has the highest visibility of the other communication devices within a predetermined region.

Preferably, the method further comprises the step of configuring one or more communication devices as a proxy for other communication devices to establish connection to the server. The configured communication device may provide the necessary details for the other communication devices to connect to the server, or to other communication devices in proximity.

Preferably, any new communication device joining the system is assigned a default network score.

Preferably, the network score of at least one of the plurality of communication devices is derived based on a weighted sum of the two or more factors.

In accordance with another aspect of the invention there is a system for relaying information comprising a plurality of communication devices, each communication device having means to transmit, receive and store relay information; a server operable to receive relay information and synchronize relay information when a connection between each communication device and the server is established; wherein at least one communication device of the plurality of communication devices is operable to broadcast relay information for asynchronous exchange of relay information when another communication device is within vicinity of the at least one communication device.

Preferably, the plurality of communication devices comprises at least one mobile smartphone device.

Preferably, the means to transmit and receive relay information based on a wireless personal area network protocol.

Preferably, the wireless personal area network protocol is Bluetooth LE or Wi-Fi Aware.

Preferably, relay information received by the plurality of communication devices is grouped according to whether it is a delivery notification, a normal sized message or a large sized message.

Preferably, delivery notifications are processed in priority over the normal sized message and the large sized message.

Preferably, normal sized message is transmitted in priority over large sized message.

Preferably, each large sized message are divided into a plurality of normal sized message.

Preferably, at least one of the plurality of communication devices is operable to periodically scan for a predetermined duration whether another communication device is within its vicinity. The at least one communication device may be operable to scan for a period of one minute for a duration of ten seconds.

Preferably, the communication device is configured to operable in a broadcast mode and a receiver mode.

Preferably, the communication device is operable to maintain a first database to contain relay information wherein the communication device is the destination, a second database to contain relay information wherein another communication device is the destination, and a third database to contain the status of the relay information in the first and second database.

Preferably, the at least one social media platform account is linked to a user account maintained by the server, the user account associated with a communication device. The linkage may be based on a unique identifier associated with the user and/or communication device.

Where the communication device is a mobile device, the unique identifier may be a mobile identification number associated with the communication device.

In some embodiments, the relay information for transmission is encrypted.

In some embodiments, relay information transmitted and received from the communication devices of a selected whitelisted group of users are provided with the highest priority in transmission and receipt.

In accordance with another aspect of the invention there is a method for relaying information using a relay chain formed by a plurality of communication devices, each communication device having means to transmit, receive and store relay information to at least one other communication device; comprising the following steps: receiving at a server, relay information from a communication device; synchronizing relay information between the communication device and the server when a connection is established; wherein at least one communication device is operable to broadcast relay information for asynchronous exchange of relay information when another communication device is within vicinity of the at least one communication device.

In accordance with another aspect of the invention there is a system for relaying information comprising a plurality of communication devices, each communication device having means to transmit, receive and store relay information; at least one communication device operable to broadcast relay information for asynchronous exchange of relay information when another communication device is within vicinity of the at least one communication device; wherein each communication device is identifiable by a unique identifier and is restricted to a maximum predetermined number of concurrent connections with other communication devices; and wherein prior to forming a connection with the other communication devices, the unique identifier is exchanged between the communication device and the other communication devices to determine an initiator and a passive connector between the communication devices.

In some embodiments, the maximum predetermined number of concurrent connections is set at three. The maximum predetermined number of concurrent connections for each communication device may be different and is made dependent on a performance metric or a connectivity metric of each communication device.

In some embodiments, the performance metric may be a network score, wherein the network score for each communication device is a measure of the reliability and effectiveness of the communication device in relaying information relative to other communication devices.

In some embodiments, the connectivity metric may be a Bluetooth received signal strength indicator (RSSI).

In some embodiments, the broadcast may be via low energy Bluetooth.

In accordance with another aspect of the invention there is a method for forming a combined relay network comprising a first relay network and a second relay network comprising the steps of: comparing a first identifier of the first relay network with a second identifier of the second relay network, wherein the first relay network comprises at least one communication device and the second relay network comprises at least one communication device, and wherein if the first identifier is different from the second identifier, the method further comprising steps of identifying one target communication device from the at least one communication device in the first relay network, identifying one initiator communication device from the at least one communication device in the second relay network, initiating one connection from the initiator communication device to the target communication device and allowing the connection initiated by the initiator communication device by the target communication device to form the combined relay network.

In some embodiments, the step of identifying one target communication device from the at least one communication device in the first relay network may be achieved by comparing one or a combination of the following property for each communication device in the first relay network: performance metric, network metric, connectivity metric or connectivity capacity.

In some embodiments, the step of identifying one initiator communication device from the at least one communication device in the second relay network is achieved by comparing one or a combination of the following property for each communication device in the second relay network: performance metric, connectivity metric or connectivity capacity.

In some embodiments, the performance metric is a network score, wherein the network score for each communication device is a measure of the reliability and effectiveness of the communication device in relaying information relative to other communication devices.

In some embodiments, the connectivity metric is a Bluetooth received signal strength indicator (RSSI).

In some embodiments, the connectivity capacity is limited to two concurrent connections with adjacent communication devices.

In some embodiments, the connectivity capacity is dependent on the performance metric or connectivity metric of the communication device.

BRIEF DESCRIPTION OF THE DRAWINGS

The present invention will now be described, by way of example only, with reference to the accompanying drawings, in which:

FIG. 4 is a table illustrating the calculation of base network score as the case for new users;

Other arrangements of the invention are possible and, consequently, the accompanying drawing is not to be understood as superseding the generality of the preceding description of the invention.

EMBODIMENTS OF THE INVENTION

Particular embodiments of the present invention will now be described with reference to the accompanying drawings. The terminology used herein is for the purpose of describing particular embodiments only and is not intended to limit the scope of the present invention. Additionally, unless defined otherwise, all technical and scientific terms used herein have the same meanings as commonly understood by one of ordinary skill in the art to which this invention belongs.

Figure 1:
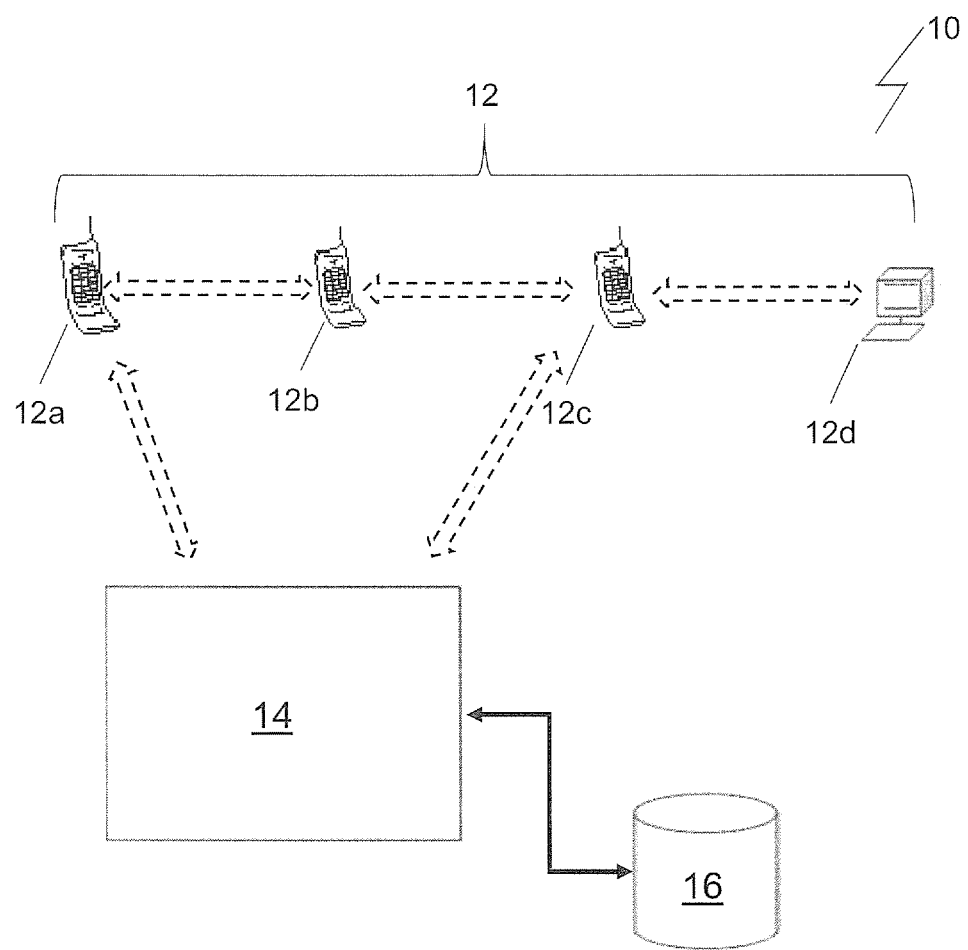
FIG. 1 illustrates a system for relaying information in accordance with an embodiment of the invention.
Figure 2:
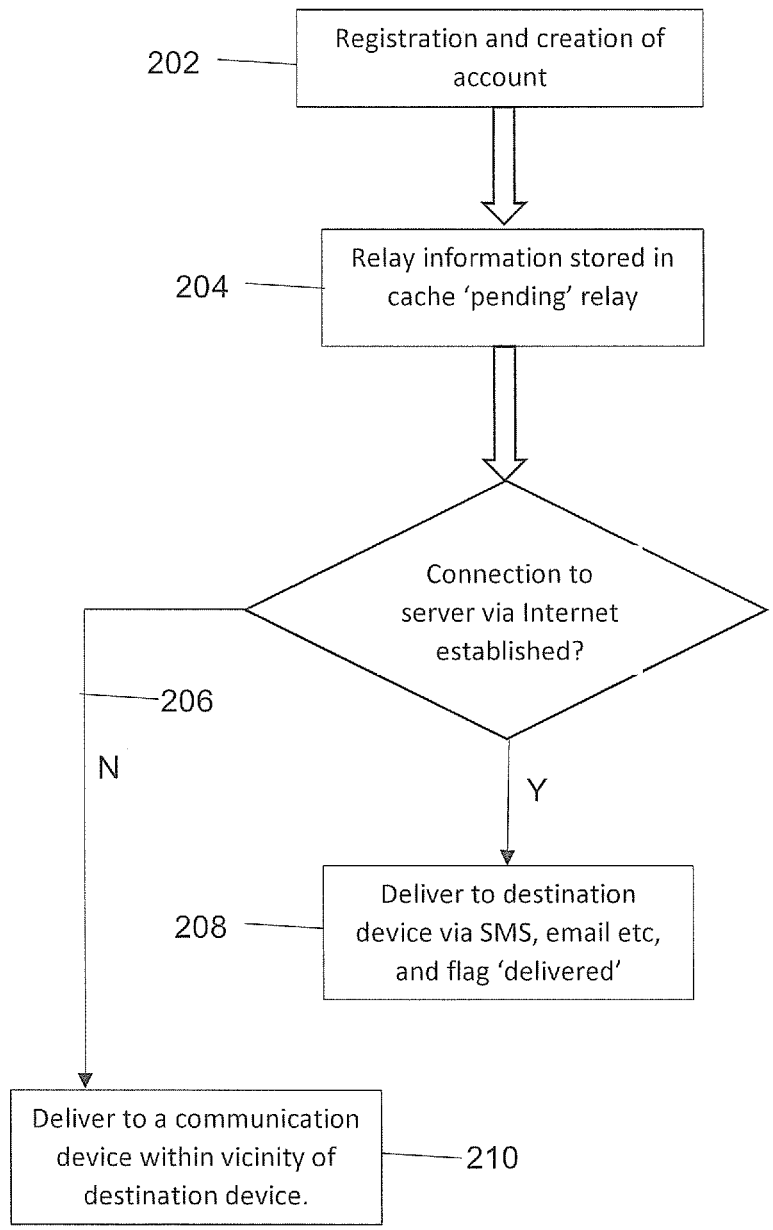
FIG. 2 illustrates a method for relaying information in accordance with another embodiment of the invention.

In accordance with an embodiment of the present invention and with reference to FIG. 1, there is a system 10 for relaying information. The system 10 comprises a plurality of communication devices 12 operable to function as relay communication hubs. Each communication device 12 therefore comprises means to connect to another communication device 12, wherein connection would include transmit, receive and store information for relay to another communication device 12. As illustrated in FIG. 1, a plurality of communication devices 12a, 12b, 12c, 12d etc. forms a relay chain for the sending and receiving of relay information such as, but not limited to, a message packet from a source (12a) to a destination (12d). It is to be appreciated that such relay information may include SMS message, multimedia message, data packets, data packages, delivery notification packets etc. as known to a skilled person. The communication devices 12 may be regarded as 'relay agents' (hereinafter referred to as agents) in some embodiments. It is to be appreciated that relay information may be used interchangeably with the term relay content. The means to connect between different communication device 12 include wired connections such as Local Network Connection or wireless connections such as Wi-Fi, mobile network data such as GPRS, 3G, 4G, Bluetooth, etc.

The term 'online' used throughout the specification will be construed to mean a direct connection to a server 14 and/or the World Wide Web without the need for relay. The term 'offline' is construed to refer to no direct connection to the server 14 and/or the world wide web, although indirect connections via one or more communication devices 12 is possible. The term 'connection' therefore includes both direct and indirect connections.

One or more of the plurality of communication devices 12 may be mobile devices located at different locations or within a region. In general, the plurality of communication devices 12 may be any equipment capable of wirelessly receiving and transmitting information, storing data, and/or performing analytics. These communication devices 12 include, but is not limited to PCs, desktops, and laptops, including nano-computers (e.g., Raspberry Pi™); smart phones; Tablet PC (iOS, Android, Windows); wireless routers with large data storage capacity; Wi-Fi repeaters and/or range extenders preferably with data storage capability; Internet of Things or IOTs, including the Amazon Echo™ and mini trackers that can communicate via Bluetooth and can store and process data; and/or transponders equipped with enough processing power and data storage capability.

To maximize reliability, effectiveness, efficiency and thereby increase the likelihood of success of the relay chain, each communication device 12 is assigned a network score. The network score is a measure of the reliability and effectiveness of the communication device 12 in relaying information, relative to other communication devices 12. Such a measure is generally specific to the application the system 10 is applied to and therefore it is to be appreciated that a communication device 12a having a higher network score than another communication device 12b for one type of application (example for offline retail/purchase) may not be the case for another type of application (e.g. for disaster relief). It is further to be appreciated that a communication device 12 may maintain, via a software application installed thereon, a set of different network scores for multiple applications and scenarios that the system 10 may be applied to.

A higher network score of a communication device, for example communication device 12a relative to another communication device, for example communication device 12b will imply that the communication device 12a is more reliable and effective with respect to the communication device 12b in relaying information. For ease of reference and understanding, the plurality of communication devices 12 may be regarded as forming a communication network for the delivery of relay information such as data packets.

Where telecommunications network connection is available and one or more of the plurality of communication devices 12 is within coverage, connections may be established with a server 14. The server 14 is operable to update the network score assigned to each communication device 12 when a connection between the communication device 12 and the server 14 is established. Server 14 may be in data communication with at least one database 16. Database 16 is operable to maintain information of all communication devices 12 including type of device, capability, present and past locations, and the network scores associated with each communication device 12. Server 14 may comprise one or more distributed servers 14 located at different locations, or a cloud server. Server 14 may be hosted by a network provider and accessible via a gateway, for example.

To facilitate communication between the plurality of communication devices 12 and between each communication device 12 with the server 14, software application (colloquially referred to as 'App') may be installed on the each communication device 12. The installed App is operable to retrieve relay information, cache or buffer size allocated for the temporary storage of relay information, memory space, and connection capabilities etc. for communication and synchronization with the server 14 once a connection between the communication device 12 and server 14 is established. The App may further be utilized to generate, assign and update the network score associated with the communication device 12.

The network score is typically a numerical measure for determining how reliable and effective a communication device 12 is. For each communication device 12, the network score is important to determine which communication device 12 to next send the relay information to. All things being equal, communication devices 12 with higher network scores get priority in terms of sending the relay information to.

Two performance measures, reliability and effectiveness, are used to determine the network scores. The reliability of a communication device 12 relates to how the communication device 12 has been instrumental in the relay chain from point A to point B. In this regard, the concept of 'critical' as a subset of reliability is important. To illustrate, whether a communication device 12 is 'critical' is defined as the fact that if a data package is relayed through the communication device 12 at some point and reaches point B in the fastest time. However, if a data package is relayed through a particular communication device 12 but did not result in the package reaching point B in the fastest time, if at all, then communication device 12 has not been critical. The network score for communication device 12 would still count if the message is eventually delivered to point B (demonstrating reliability), but his network score will not be as high compared to another communication device 12 which has been critical.

Effectiveness is measured in terms of how fast relay information packets, relayed via a particular communication device 12, are able to reach their intended destinations, if at all. Or it can also be measured in terms of how often packages sent via a communication device 12 are able to reach their destinations within a given time frame.

To illustrate the above, if a communication device 12 is able to deliver, on average, data messages within thirty (30) minutes, then he would get a network score higher than someone who delivers it an hour. As another example, a communication device 12 able to deliver 80% of all data packages sent through it within 30 minutes will have a higher network score than another communication device 12 that takes an hour.

It is to be appreciated that network scores are specific to particular applications, transactions, or activity. For example, a communication device 12 may have one network score for regular instant messaging, and a different network score for posting a help message (e.g. a SOS message) to a cloud database (e.g., Google's Person Finder). In addition, network scores are relative and they are adjusted depending on how one communication device 12*a* fares versus another communication device 12*b* in a particular area. Measuring one's performance versus others (for update of network score) may be done at the communication device 12 level as a first pass basis, and when situations do permit, such as when Internet connection is available and the communication device 12 establishes a connection with the server 14, then the update may be done at the server 14 using a large user database 16 with more powerful processing systems.

Network scores are also not static. Network scores change continuously based on how one communication device 12 performs relative to other communication devices 12 in their proximity. For communication devices 12 that are mobile (i.e. mobile devices such as smartphones), such mobile devices move about and come into contact with a different set of communication devices 12, so would their network scores change based on how they compare to these new communication devices 12.

As to be appreciated, network scores may be assigned or updated by the communication device 12 or server 14 where connection is established between the communication device 12 and server 14. Once connection is established between the communication device 12 and server 14, the network scores may also be synchronized.

The network scores may be determined, calibrated, and modified (on device 12 or server 14) using the on-device installed App, using heuristic and descriptive analysis techniques, and when available, using one or more cloud-based servers, employing more sophisticated analytics methods, including statistical, predictive, prescriptive, and Big Data.

In the absence of a connection between the communication device 12 and server 14, the communication device 12 may adjust or update its network score based on heuristics, descriptive based analytics, the most recent network scores of its agents and quantitative measures. Examples of such measures include predetermined packages forwarded to more than a predetermined number of agents (for example more than six (6) agents); packages received within the same time window; number of successfully transported packages; number of times the network is deemed critical in the transport of relay information gathered from other communication devices 12 with which they come into contact. The network score of the communication device 12 may be adjusted to reflect how each communication device 12 now fare with others using fresh data.

Synchronization between the communication device 12 and the server 14 may take place when a connection is established via mobile data, Wi-Fi or other forms of Internet connection. The App installed on the communication device 12 constantly scans for the availability of network connection. Once a connection is established, information gathered by the App is synchronized with the servers 14.

The synchronization process may be two-way. Fresh data, proprietary to each communication device 12 are sent to the server 14. Data gathered and processed by the servers 14 from all other communication devices 12 are sent down to each communication device 12. Network scores are changed or updated where applicable. The weighing of criteria that help determine network scores, for example, might change. In some embodiments, "If-then" rules may also be introduced that override the simple rule of "deal first with the one having the highest Network Score."

At the central or cloud-based servers 14, a dynamic database 16 continuously grows as more communication devices 12 establish connection with the servers 14. To cater to the fast growing database, the fastest of processing technology and the latest of heuristics, statistical, predictive, prescriptive and Big Data analytics methods may be deployed for analysis.

As a result of synchronization whenever connection between the communication device 12 and server 14 is established, the network scores change continuously to better reflect the effectiveness, reliability and criticalness of each communication device 12. Rules for updating the network scores may be added, modified, or deleted.

For example, a communication device 12*a* with a Network Score of eighty (80) may have this lowered to, say, sixty (60) if it is discovered that the other communication device 12*b* or 12*c* near communication device 12*a* have better statistics, even if he has yet to come into contact with those agents for a direct comparison of his performance.

As an example of rule base change, if it was discovered that certain communication devices (say 12*c*) with a relatively high network score is about to leave a certain area (their likely place of work), their chances of connecting to the Internet or getting near other communication devices 12*a*, 12*b* will drop dramatically in the foreseeable time period in the future, then the network score of communication device 12*c* can be lowered and other nearby communication devices 12*a*, 12*b* can be notified that communication device 12*c* "is about to head off work in a short while, conserve your relays to him, and if you do, do not count those as "good" relays. Alternatively, the network score may be retained but the other communication device 12*a*, 12*b* notified. Such exceptions described above overrides the simple rule of "prioritize transfers to high Network Scoring devices. Indeed these devices may have high Network Scores now, but soon their scores will mean less when out of the office and offline from the Internet.

As described, each communication device 12 comprises means connect to another communication device 12, including transmit, receive and store information for relay to another communication device 12. In some embodiments, one or more communication devices 12 may support an array of wireless connectivity for transmitting, receiving and storing information for relay to another communication device 12. These wireless connectivity options include, but are not limited to, Wi-Fi (infrastructure or ad hoc/direct), telco-based 2G/3G/LTE, NFC, and Bluetooth. The introduction of Bluetooth low energy (LE), as opposed to Bluetooth "classic," has the following advantages:—

When left in the switched on state, Bluetooth LE does not impose any significant penalty on battery life;
Unlike Bluetooth classic, Bluetooth LE requires no explicit handshake and session to take place between the communication devices 12.

A communication device (such as a phone) 12 with Bluetooth LE switched on constantly scans for and listens to other communication devices 12 that are on it. This is advantageous for its application as part of the relay chain, functioning as a relay network node.

However, Bluetooth LE comes with its own limitations. It has a theoretical speed limit of 1 Mb/s, which in practice, can be lower once other factors are considered. Bluetooth LE also communicates slower than Bluetooth classic which runs at theoretical maximum speed of 4 Mb/s. In this regard, although Bluetooth LE is a straightforward way of exchanging bursts of information, such as message strings with fast and low process overhead, the WLAN 802.11 may be regarded as the fastest means for communicating with each other on today's smartphones.

Each communication device 12 is operable to periodically scan for other communication device 12 with which it can relay information to and receive relay information from. However, where an Internet connection via Wi-Fi, 2G, 3G, LTE etc. is present and connection to the server 14 is established, the App installed on each communication device 12 is operable to then synchronize relay information and content with the server 14 and retrieve relay information and network scores pertaining to other communication device 12 around the vicinity of the server 14. As the server 14 is able to process relay information more completely and faster than any of the communication device 12, the server 14 may be regarded as a global synchronization or updater when a connection is established.

In operation, considering the fact that each communication device 12 is a 'network hop' and coupled with the fact that connection to the server 14 for a global synchronization and update of network score may not be continuous, there is a need to have a packet forwarding mechanism at the device level, working in conjunction with the network score as a performance metric, for the purpose of deciding the following:—

1. The next communication device 12 the relay information should be sent to next;
2. When the relay information should be sent;
3. Which of the other communication devices 12 to receive information from (in order of priority); and
4. When should relay information be deleted to make room for other relay information.

To facilitate the above, each communication device 12 may comprise one or more caches used for marking or tagging relay information. For example, relay information may be tagged based on the following statuses:— a. "Pending"—relay information resides on the source communication device 12 used to compose the information and has yet to be transmitted to another communication device 12;
b. "In transit"—relay information has been relayed to at least one communication device 12. The actual number by which a relay information may be tagged as 'in transit' is arbitrary and depends on the application. It may be set to a predetermined number, such as three (3) communication devices 12, before being tagged as 'in transit'.
c. "Delivered"—a relay information that has been delivered to the target recipient.

Due to the asynchronous nature of messaging in the system 10 (i.e. intermittent connection between each communication device 12 and the server 14), the same relay information may be tagged or marked differently at the server 14 and on each communication device 12 keeping track or in the chain where the relay information passes. In theory, all communication devices 12 and server 14 will at some point be synchronized to reflect the same status.

Where the relay information is sent to the server 14 due to the availability of connection, the server 14 may directly push the relay information to the target destination (say device 12*d*) should a connection be established between device 12*d* and the server 14. The status is then tagged immediately as "delivered" and any communication device 12 along the relay chain with connection with the server 14 will be updated (e.g. device 12*b*). For the remaining communication devices 12 (e.g. 12*c*) where connection with the server 14 is not available, these will be updated by the other communication devices 12*b* in due course via device to device connection using Bluetooth LE for example.

For relay information confirmed as delivered by the server 14, although the relay information may not have been updated on the communication device 12, such delivered relay information are deleted from the system 10 although an information identifier associated with the relay information is kept or maintained in the database 16. This is to allow the source of the relay information to check and verify that the relay information has been successfully delivered.

In the synchronization process, the server 14 checks for relay information tagged "in transit", i.e. relay information not flagged as delivered by the communication device 12 synchronizing with the server 14 that are intended for users who have been identified near the communication device 12 or likely to be within reach by a cluster of communication devices 12 in a particular region or location. These "in transit" relay information are downloaded by the communication device 12 performing synchronization with the server 14.

The server 14 may be operable to send the relay information in the form of an SMS message should there be the necessary infrastructure, e.g. SMS centre, and/or telecommunications carrier, supporting the same. The relay information in the form of the SMS message may then be sent directly to the destination communication device 12 and if the destination communication device 12 is connected to the server 14 or regarded as 'online', it will receive the message instantaneously.

Where one or more of the communication devices 12 are also smart phones, the smart phone 12 may become a proxy in the form of a personal hotspot and in particular a Wi-Fi 'personal hotspot' for providing a source of 'Internet connection' for all other agents in the chain and for simply enabling the faster transfer of information among agents 12 via Wi-Fi around the range covered. This is especially advantageous in at least two (2) scenarios:— i. where the personal hotspot of one or more smart phones 12 (hereinafter referred to as 'host') may be utilized by other communication devices 12 for establishing a speedy connection, via the Internet to the server 14;

ii. in cases where the proxy smartphone 12 has yet to establish an Internet connection, the proxy smartphone would enable much faster connection among agents via Wi-Fi (e.g., WLAN 802.11AC), as opposed to other types of connection such as Bluetooth.

In both the scenarios described above, the App installed on the smartphone may further be configured to automatically turn on the 'personal hotspot' for other communication devices 12 in range to use as their Wi-Fi connections to the agents who may have established stable, and speedy connections to the Internet.

Both the above scenarios aim to speed up and improve the probability that messages travel from origin to destination.

In some embodiments, the agents connecting to communication devices 12 functioning as personal hotspots may not be as plain or straightforward as that of Bluetooth LE or Wi-Fi Aware™. In these cases, agents must all agree to connect to the devices functioning as personal hotspots via a simplified login algorithm. Explicit permission, at the individual or group level, may be required for the communication devices 12 to connect to the personal hotspots. In some embodiments, Bluetooth LE may be used as the medium for informing the other communication devices 12 of the proxy smartphone's SSID and password, in particular for that connection session.

Where multiple communication devices 12 are able to connect to the server 14 with different types of connection options, a selection or election process may further be implemented to select the most suitable communication device 12 to be the proxy or the 'personal hotspot' host. An example of a selection criterion may be based on the device who has the best quality or highest bandwidth connection to the server 14 (e.g. WLAN 802.11 if available, followed by 4G, 3G etc.) and/or a communication device 12 which meets certain minimum requirement(s). Another selection criteria may simply be the communication device with the highest network score, as would be the case if no communication device 12 has any form of Internet connection.

In the scenario in which most of communication devices 12 are using Bluetooth LE to establish the relay of information, a communication device 12 may attain a higher network score by 'listening' and/or 'publishing' relay information historically, more actively or aggressively than other communication devices 12 in the vicinity, hence maximizing its likelihood of achieving the 'critical' and 'effective' criteria.

While the rules for updating network scores appear to tend towards a situation where the communication devices 12 with higher network scores improve their scores at a faster rate at the expense of the communication devices with lower network scores, leading to a situation where 'the strong becomes stronger and the weak becomes weaker', it is to be appreciated that a factor of network score that takes into account the average network scores of communication devices in the proximity may be implemented to 'help' effectively the weaker communication devices 12, hence a communication device 12b having a high network score will also benefit the communication devices 12a, 12c, 12d in its proximity. As a group, the communication devices 12a, 12b and 12c and 12d will hence transmit and relay information faster.

Further, the communication devices in the proximity of the communication device 12b may benefit from the fast and successful delivery of relay information as they in turn form part of the network chain and hence improve their critical and effective scores. In particular, it is to be appreciated that a faster delivery of relay information by a group of communication devices 12 will make room in the system for more relay information to be routed or relayed through the same system.

In a large ecosystem comprising a large number of communication devices 12 and server(s) 14, build-up of relay information due to duplication and synchronization needs to be managed, otherwise physical or virtual resources such as caches and buffers within the system may be utilized quickly, leading to break downs or failures in the relay of information due to inability of the system 10 to handle any more information. In order to manage the build-up of relay information, organization and classification of relay information in the form of an indexing system may be implemented. The indexing system provides a logic or algorithm to measure to what extent the relay information has been passed on in the relay chain. For the sake of illustration, relay information in the form of discrete data packages may be used as an example. Every time a data package is relayed to one or more communication devices that meet a certain criterion/criteria, the index is incremented. The indexing system therefore monitors or track data packages that have passed on along the relay chain to a certain pre-determined number of relay 'hops', thereby achieving a high degree of certainty that those data packages will reach the target destinations in reasonable time (such as within 24 hours or one day). In other words, the index is a form of measure on the likelihood or probability of success of delivery. Once data packages are indexed to a level achieving high degree of certainty of being delivered, the data packages are deleted from the communication device 12 which has been used as part of the network chain so as to make space for new data packages. The App installed on the communication device may be used to monitor, track and manage the cache or memory resources used to store or buffer data packages.

As another example, the communication device 12a may be operable to track each time a data package (or a batch/tranche of messages) is relayed successfully to another communication device 12b. A numerical number which is associated to the network score of the communication device 12b receiving the data packet may be added to the index of the communication device 12a. Depending on the network scores of communication device 12b, the index of 12a may be increased by a pre-determined value of 1.5, 1.0 or 0.0, for example. An increase of higher numerical value (e.g. 1.5) may be assigned to the communication device 12a should the network score of communication device 12b be high. In general communication devices with higher network scores trigger higher increase in index while communication devices newly added into the system yield 0.0 increments, for example.

The App installed on the communication device may be operable to allocate a data package cache of anywhere between 20 MB to 100 MB, for example, depending on the available memory of the communication device 12 and the processing power. As the data packet size nears to the maximum amount allocated, say around 85%, the communication device is operable to delete data packages.

The deletion of the data packages may be based on the following basic rules:
- Delete data packages marked 'delivered', or those marked 'recalled' by the sender.
- Delete data packages that already have been relayed for many times, as suggested by the index. A threshold index may be set (e.g. 6.0) such that any data packages exceeding the threshold index will be deleted. The final threshold number set may depend on statistical analysis performed that shows the optimal trade-off between the threshold indices and the incremental improvement in the likelihood and speed by which the data packages are delivered.
- Delete data packages that have reached a maximum time period within the system, say forty eight (48) hours, based on the rationale that these data packets are unlikely to be relevant.

Although data packages may be deleted from the system 10, the communication device 12 may be configured to keep receipts of data packages that have been relayed through the device 12. Such receipts are important to indicate the status of the data packages. As the communication device 12 encounters or communicates with other communication device 12 for the relay of information, message caches may be compared between different communication devices 12 with the objective to discover which data packages have been delivered, in transit, pending or recalled. In this regard, a line-by-line referencing of the statuses between the communication devices 12 may be time-consuming. Space efficient data structures that provide immediate feedback on the status of particular data packets such as Bloom Filters, may be deployed. A bloom filter is typically operable to indicate with a high probability level if a particular item is a member of a set without looking through the entire cache.

The system 10 is particularly suited for establishing communication in a disaster relief operation, especially when the communication infrastructure is down or affected by the disaster. In such an embodiment, the plurality of communication devices 12 forming the relay chain are likely to be mobile devices. Where such mobile devices have computer capabilities (e.g. smartphones), they are installed with the App to facilitate the calculation/updating of network scores.

Prior to use or installation of the App, the communication device 12 held by a user may be prompted to register and create an account with the system 10 (step 202). The process for registration and creation of account is known to a person skilled in the art and will not be further elaborated. The process of registration and creation of account may also include permission with regards to whether the user wishes to join as one of the network devices for disaster relief (i.e., a "volunteer"). In the following description, the terms users, subscribers, and agents may be understood to include their communication devices 12.

In an example scenario, once the App is installed, a source (user A) composes a relay information requesting for help to be sent to a destination user B. For the purpose of illustration, the relay information is a media message containing a low resolution photograph. The media message may be added to the cache of the communication device 12a. The cache may comprise such relay information created by user A or other relay information being relayed to user A. These are marked as 'Pending' (step 204).

The App installed on communication device 12a constantly (periodically or otherwise) scans for other communication devices 12b, 12c, 12d to which it can relay and from whom it can receive messages. However, if it has access to the Internet (via Wi-Fi, 2.5G/3G/LTE), the App proceeds to prioritize the synchronization of messages and scanning for new ones at the server 14. As the World Wide Web captures wider coverage of users compared to any other types of ad hoc wireless connection, the servers 14 can, in general, analyze data and in particular, process messages faster and more completely than any communication device 12 with limited computing power and adopting localized Bluetooth LE connections. It is to be appreciated that servers 14 may comprise the latest and most powerful computing machines available, and are capable of employing sophisticated data analytics, such as Big Data analytics methods.

If access to Internet is not available (step 206), the user A checks if user B is within Bluetooth range of User A. If so, the message is delivered to user B and flagged 'delivered' (step 208). If user B reside in a chain of other users subscribing to the disaster relief efforts, the message is delivered to user B and flagged as such.

The system also checks for connections such as Intranet Wi-Fi, personal hotspot, or ad-hoc Wi-Fi. If user B is within the same Wi-Fi network as user A, and visible to User A and identified as such, the message is delivered to user B (step 210). The various connections (Bluetooth LE, Wi-Fi etc.) may work in conjunction. For example, Bluetooth LE allows the disaster relief members to discover other members in proximity; check if they are on the same Wi-Fi network, then if so, exchange device information such as MAC addresses, IP addresses, usernames, and allow Wi-Fi sessions to take place. Wi-Fi works much faster than Bluetooth. This process may be similar to how Apple's ad-hoc service for data transfer Airdrop™ works.

As mentioned, there will be instances where messages are sent directly from the servers 14, directly to target recipients as real text messages or SMS. In another variation, encrypted text messages may be sent to the disaster relief App by a user nearby or possibly nearby the target recipient.

Aside from sending text messages or SMS, a copy of the messages in the servers 14 may be transmitted directly to the target recipients (or to the other subscribers to relief efforts near them) through other electronic means, such as using email.

Once a connection has been established between a communication device with another (or in the case of Bluetooth LE, when User A's App begins to "publish" messages for nearby communication device to "listen"), the order by which messages are transmitted to nearby devices may go as follows:
1) User A's own messages are sent (or published) first, followed by;
2) Urgent messages such as certified SOS and other first responder initiated or flagged messages;
3) Followed by the FIFO (First-in-First-Out) rule; applied to the rest.

However, there are exceptions to the above order (basic rule), for example, when a message has been there a long time (say, several days), and hence is probably irrelevant, or likely has reached its intended recipient, though its delivered status is not yet reflected on User A's App. These older messages will be pushed down the chain.

When a message or data package, containing media, exceeds a certain pre-determined size, such as several megabytes of data, that it can cause a slow down on or an outright halt to the transfer of the messages that come after it, then this "bandwidth heavy" message may be pushed down the priority queue or put on standby until a faster wireless medium becomes available, e.g., Wi-Fi ad hoc or on the Internet or a telco's 3G or LTE service.

Relay information such as messages coming from people or first responders at a site recently struck by disaster or where an accident has just occurred is crucial for the reason that it is a race against time and hence pertinent to be relayed to the rescue workers, so that these rescue workers are able to respond immediately in order to save lives). These messages are designated with highest priority to be sent out with utmost urgency, using an agent-to-agent with a Last-In-Last-Out rule for relaying messages, the notion being that those SOS messages are coming from people who still have a high likelihood of being rescued.

In the presence of multiple users each having a communication device, user A (with its communication device) uses its associated network scores to prioritize who among the multiple users get to receive "Pending" and "In Transit" messages. Users with higher network scores will get the messages first. This is the case for session-based type communications.

The following is an example of how the App works when a session-based or one-to-one communication is used. As an illustration:

When User A is within proximity of User B, User C and User D. All devices—B having network score of 80, C having network score of 60 and D having network score of 70 have indicated their availability to accept messages. User B with the highest network score will receive messages first, followed by User D, and then User C.

For broadcast type communications, as such non-session based, such as that employed by Bluetooth LE and Wi-Fi Aware or Wi-Fi multicast, the "listening" agent scans for agents in a "publishing" mode. The listening agent, in order to prioritize from whom it records messages from, chooses those ones with higher network scores first. A Bluetooth LE connection would allow an agent to listen to multiple publishing agents at the same time. There is, however, a limit, as with any, to the number of other users and speed by which data can be transferred using Bluetooth LE—a limit far lower than session-based Bluetooth Classic. Such limit means the communication device (with the App installed) must be able to prioritize from which communication devices 12 it should listen to first. As most user-to-user interaction are transitory events, the issue of "noise" is also a concern. For example, in a "room" or region full of subscribers to the relief effort, where many agents are publishing at the same time within the same or similar bands of frequencies, make it harder for listening agents to record data efficiently with few errors.

In view of the foregoing, in a crowded room, subscribers are instructed to use certain "Labels" to help even out the transmission of messages by grouping messages into respective "Labels" while reserving certain "Labels" for priority messages only. Examples of Labels used might be: LifeLite, Life_0, Life_1, Life_2, and LifeSOS. The nomenclature illustrates their purpose.

Labels may be created automatically by the apps and made readily visible to other agents/users in proximity. The App associated with each device 12 can organize themselves to rename Label(s) to avoid crowding a particular channel (or "Label" for that matter) and according to their relative network scores. For examples, communication devices 12 of users with network scores from 70 to 80 go on to channel 'Life_1', those with scores above 80 go on to channel 'Life_0'. Only Red Cross first responders on active duty go on channel 'LifeSOS'. No one else gets to use the LifeSOS label.

Self-organization may become more challenging as the number of users in a particular area increases dramatically. More refined granular labelling may be introduced; the simple rule of "High Network Scores First" relaxed, in favour of new users flagged as carrying very urgent messages. Certain subscribers may have outdated network scores if, for example, they have not been able to synchronize with the servers 14 for a period of time or received their most recent network scores via subscribers who have recently synchronized with the servers 14. There may thus be one or more cases of overcrowding of newly minted subscribers in a particular Label.

There may include the possibility of third party apps complementing the App installed on communication devices 12 to be able to direct with more granularity which channels or frequencies to use in transmitting data. In the case of Bluetooth LE, this means telling an agent, which from among a predetermined number of Bluetooth LE channels (40, for example), to transmit, while in the case of Wi-Fi, the bands (2.4 GHz, 5.0 GHz) and Channels (typically ranging from 1 to 14) to use.

Out of the plurality of subscribers, a subscriber and his communication device 12 may be selected as a host or proxy to instruct nearby communication devices what to do. For example, in a room of fifty (50) agents, most within thirty (30) meters of each other (i.e., Bluetooth's operating distance), the host may be selected based on the communication device 12 that is the most "central" of all users within a particular area of Bluetooth LE and that which meets the minimum processing power and memory size of a smartphone as may be required to be the host.

The process by which the system 10 elects the host for labelling is by scanning and looking for who among all relevant users in a particular area has the most quality connections, or as a proxy host, who among them is able to have a connection with the most number of users nearby. That user becomes the host for that session.

The host then proceeds to tell the other subscribers which labels to use in publishing (or transmitting) messages. Subscribers with very important packages to deliver (or those with high network scores) get allocated Labels with fewer user counts, thereby insuring better chances of complete, error free delivery of messages. In the case of the Red Cross first responders, they are all told to use the Label "LifeSOS."

The rest are assigned to the regular broadcasting Labels more or less evenly dispersed.

It is very possible that the host may not actually see all users nearby, especially those at the fringes, at that time it assigns the Labels. For those users, a default Label may be assigned. This may be done via communicating such through a relay chain, if at that time of assignment, that user is not visible to the host. Hence, eventually, all within proximity will be assigned the proper Labels. For Wi-Fi multicasting, the system is similar, but given the faster speed of the medium, more subscribers are allowed to transmit per frequency range or band ("Label" in the case of Bluetooth LE.)

In the various embodiments as described, the consideration associated with the calculation, calibration, and update of the network score may work as follows:

The network score must reflect the historical reliability and effectiveness of a user in the relay network or system, as of a particular point in time. It must be truly indicative of one's strength as an agent in enabling preferably the end-to-end delivery of messages.

The determination of network scores is an iterative, continuous process. Every new user is assigned a default score at the beginning, which may then be adjusted upwards or downwards subsequently.

An algorithm or equation consisting of factors and weights may be used to help re-calculate that score. Factors consist of a range of determinants—be they based on hardware, software, environmental, and other situational elements—that largely determine how likely and rapidly messages can get through the system.

Figure 3:
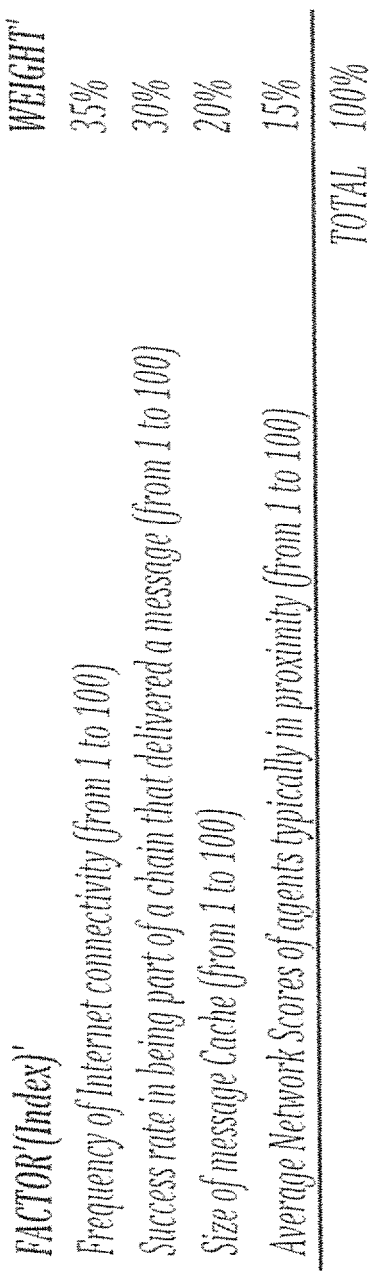
FIG. 3 is a table illustrating the weighting of factors used for the calculation of a network score.

Factors have a direct or indirect impact on the likelihood of a successful electronic transfer or relay of messages/data packages. When it is difficult to determine and quantify certain Factors, proxies may be used instead. Weights may be attached to Factors, which are then summed up to calculate a network score. The iterative process of calculating scores involves the redetermination of weights and factors. Weights can be lowered or increased. New factors may be introduced or existing ones deleted. FIG. 3 illustrates an example of the weighting of factors.

The many methods of data analytics, aid in the process of the determination of weights, factors and ultimately, the calculation (and re-calculation) of the network score. The ultimate goal is to increase the speed and certainty by which messages are relayed, end-to-end. For example, in a disaster relief network—in this case, how Network Scores become more indicative and predictive of such.

Listed below are sample factors that may be used in determining network scores (this by no means is meant to be exhaustive or complete):

Message Flagging and Size of Message Cache

The more packages flagged 'Important' or 'Urgent' in a cache, the higher the agent's Network Score.

All things equal, the smaller the cache size, the higher the Network Score—the theory being that on a FIFO system, messages held in a smaller cache will be transmitted sooner.

Internet Connectivity

Frequency and duration of connection—How often does a user's communication device 12 connect to the Internet and hence establish a connection with server 14? On average, how long does it stay connected? The more frequent and the longer one stays connected, the higher the network score.

Speed of connection—When connected to the Internet, at what speed is the communication device 12 able to do so? The faster, the higher the Network Score.

Time of connection—At what times does a user connect to the Internet? At around those times when a user typically gets good internet connection, his Network Score increases.

Is the user a post-paid or a prepaid plan mobile subscriber? If prepaid, does he purchase Internet plans with larger volume caps? A post-paid user will by default have a higher Network Score than a prepaid user. A user who purchases large volume plans will have a higher Network Score.

Communication Device Specification (in Particular Smartphone)

How much memory is taken up by the App? The larger, the lower the network score. (The more space taken up, the more time required to unload messages and the more agents one has to connect to propagate messages.)

How "powerful" or "fast" is the smartphone? The faster the CPU, the higher the network score. How much CPU resources are being consumed? The higher the CPU usage, as would be the case when running more apps in the background or performing graphics intensive task, the lower the network score. CPU power and unutilized capacity are regarded as proxies of speed by which a device 12 can process messages and communicate with other devices 12.

How much battery or electrical power remains on the phone? At what level, on average, is the battery charge kept? The higher the battery level, on average, and at those particular points in time in which it is, the higher the network score.

How new is the phone model? How new is its OS? An iPhone™ 6 for example gets a higher network score than an iPhone 5. An iPhone 6 with OS 8.4 gets a higher network score than one with OS 7.0.

Type of Wireless Connectivity

The array of connectivity methods available on today's smartphones: Wi-Fi, Bluetooth (Classic and LE), NFC and telco-based 2.5G/3G/LTE.

Setting aside connectivity associated with telecommunications providers, Wi-Fi ranks fastest among these. An agent able to connect to another agent via Wi-Fi will have a higher Network Score.

Bluetooth Classic is faster than Bluetooth LE but requires an active session between smartphones. But when a one-on-one session Bluetooth Classic connection can be initiated with a particular user, that user will have a higher network score.

A distinction between connectivity for "discovering" users and "handshake" types versus connectivity used for the actual transfer of relay information or data, or messages, in the case of applications or systems associated with disaster relief, is made in the calculation of the network score. It is the transfer connectivity that determines the Network Score. (Apple™ Airdrop, for example, uses Bluetooth to find other Airdrop users and initiate a connection, but the actual transfer of media files occurs over Wi-Fi.)

The App relies mostly on Bluetooth LE for data transfers. But when a team of users has explicitly allowed higher speed transfers via Wi-Fi, as would be the case for a team of First Responders, then these communication devices get higher Network Scores.

Mobility, Proximity, and Density Considerations

The more nomadic a user, the higher his network score. Being mobile is, however, to be distinguished from moving about places fast in terms of speed. To illustrate, a subscriber walking has a higher network score than another subscriber running. A running person does not allow much time to exchange messages with stationary agents and hence the lower network score.

The more concentrated the agents are in particular areas, the better the chances of wider and faster message propagation. It is to be appreciated that this situation by itself does not affect a network score; rather, how often a user finds himself in these particular areas is what does; the more frequent, the higher his network score.

Historical Factors (Including Circle of Friends and the Theory of the Six-degrees of Separation)

A person tends to hang around the same of group of people. The higher the network scores of his group, the better his network score, as well.

Over time, users will build up historical records of their performance as relay messengers. These historical records present metrics that are highly quantifiable. Examples include: the percentage of messages that ultimately reach their destinations, the average speed by which they get to do so, and the total number of messages handled. Empirical data is regarded as the most reliable form of data for purpose of the quantification of metrics. However, there must exist a strong correlation between an agent's performance and what his network scores were during those relevant periods. Thus, the programming approach and analytics methods used in analyzing user behaviour and calculating network scores are iterative, adaptive and capable of learning.

Based on the theory that everyone is connected, at most by "six degrees of separation," the system aggressively seeks the fastest pathways from one person to another, likely those with minimal hops. In line with this Six Degrees of Separation theory, users part of relay chains that consistently enable the delivery of packages with the least number of hops, say, much lower than "six," for example, are awarded higher Network Scores.

It is to be appreciated that a network score is relative. One's network score is calculated based on the scores of other users within his vicinity. A Network Score is never static. In fact, it may change dramatically, several times throughout a day.

As examples, a person active on the Internet today may not be so the very next day. A user, whose network score ranks highly in a suburb where he lives, becomes "average" when he goes to work in the nearby city; hence, his network score will be lowered to reflect this.

Weighting of Factors

Factors affecting network scores may be weighted based on the consideration that some factors are stronger determinants relative to others. It is to be appreciated that the weighting of Factors is not static and is subject to change depending on the situation in which a user finds himself. The weighting of factors may further depend on the application of the relay chain/system.

As shown in FIG. 3, a heavier weight is placed on how frequent an agent is able to connect to the Internet than the average Network Scores of those agents with whom he typically comes into contact. FIG. 4 shows an example of how a base network score is calculated. New users start out with a Base Number of, say, 50. Then as time goes by, the indices are adjusted, as the user comes into contact with other subscribers to check how he compares with others on these factors. If the user is able to connect to the servers 14 via the Internet, the system checks how he compares to other users within his area. The indices are adjusted accordingly.

The system constantly checks if the factors used and their weights, combined to derive network scores, correlate with the actual performance of the subscriber as part of the relay chain. For example, is there a strong correlation between the factors and the agent's effectiveness and criticalness in the system? Over time, the factors, their weightings, and how network scores are calculated and assigned should become more accurate in predicting future performance. It is therefore to be appreciated that such factors, weightings may undergo a constant learning or updating process.

Using the various analytics methods mentioned above, a couple of things are done to achieve a stronger correlation between the Factors/Network Scores and the users' actual performance:

Weights adjusted

Factors introduced or existing ones deleted

Discernment of patterns based on time, mobility, location, density of users, and activity on the communication device (smartphone), that may aid in improving the correlation between Factors/Network Scores and actual performance.

For example, pattern analysis would allow a user to change the weights dynamically depending on the situation in which the system subscriber users find themselves. The system then checks again how the correlation between the Network Scores and actual performance has improved or degraded. Weights are again adjusted; Factors introduced and/or deleted. The servers 14 continuously analyse streams of data coming from the numerous subscribers in the system.

Again, a user may have more than one network score: the network score and the process of calculating it for a specific use in case of the Pony Express technology. As in the example above, it is used for an instant messaging application, with first responders given priority.

In another embodiment, the plurality of communication devices 12 may be arranged to form a relay chain without the utilization of network scores. In such an arrangement, each communication device 12 comprises means for storing relay information as well as means for transmitting and receiving relay information. This arrangement is particularly relevant when there are only few subscribers 12 for a particular service and when most of them frequently come into contact with each other. But as the communication devices 12 in the system 10 increases in number and spreads out geographically, the network score becomes an increasingly important parameter to determine which communication device(s) 12 get to transmit/receive relay information to/from. Each communication device 12 is capable of storing massive relay information in its cache, and may retain such until much has been forwarded to other devices 12 to achieve a high likelihood that most if not all reach their intended destinations. It is hence to be appreciated that all communication devices 12 in the system are not required to be online at the same time and that the exchange of data packages may thus be performed asynchronously.

For exchanging relay information, the communication devices 12 may be configured to broadcast and receive data packages continuously and randomly from other communication devices within proximity.

In addition to wireless technology such as Bluetooth LE, it is to be appreciated that other wireless network technologies are capable of continuously transmitting and receiving relay information with minimal power consumption, do not require one-on-one handshakes or authorization, and are especially suitable for emergency relief operations where relay information, in the form of SOS or other request for help messages/data packages, are propagated quickly and reliably without much hassle. Those wireless technologies enable relay information/data to be exchanged asynchronously. Relay information is broadcasted or published continuously, and other communication devices can simply "listen in" and download data. No pairing or handshaking is required.

Further, a sort of 'indoor GPS' may be created among the plurality of communication devices 12. In the event where one or more communication devices 12 are smartphones, the App installed on these smartphones 12 may be used to retrieve contact list information from other smartphones 12 to determine the preferred communication devices from which to receive and to which to send relay information—this is an alternative to using the network score system as means for prioritizing.

The foregoing embodiments have described the relay of information from a source communication device (e.g. 12a) to a destination communication device (e.g. 12d), the server 14 forming part of the relay chain when one or more communication devices 12 establish connection to the server 14. It is to be appreciated that the communication devices 12, having established connection to the server 14 (for example a cloud server), may utilize the server 14 to directly deliver the relay information to the destination communication device via a variety of ways such as emails, SMS, etc., thereby superseding the one-to-one relaying of information.

In the case where the destination communication device 12d has not or is unable to establish a connection with the server 14, the server 14 may utilize location based services or other information suggesting the location of the destination communication device 12d (for example device 12d's last shared GPS data or most recent IP address), probability analytics, and/or historical records relating to the possible location of the destination communication device 12d for directing relay information to any communication devices 12 within the proximity of the destination communication device (e.g. 12c), so that communication device 12c may relay the information to the destination communication device 12d directly or through propagating to other communication devices within a relay chain, In the above cases, it can be appreciated that the server 14 functions as a relay super-highway or a 'wormhole' akin to a shortcut which saves time in the sending of relay information as fast as possible to the destination communication device 12d.

The above embodiments describe a robust relay system for relaying information in a wireless manner regardless of whether an online connection could be established with the server 14. Where there is no online connection via Wi-Fi and its variants, USSD, Mobile data including GPRS, 3G, 4G, EDGE etc, wireless capabilities on each communication device such as classical Bluetooth or Bluetooth LE may be utilized to effect relay of information between communication devices that eventually will arrive at the destination. The Bluetooth LE has been identified as a communication protocol that is energy efficient for transmission of data between smartphones.

Where there are multiple relay information to be transmitted, received or stored (hereinafter collectively referred to as 'processed'), the relay information may be placed in a single queue within the allocated cache of the communication device 12. The relay information (also referred to as payload) are typically processed sequentially on a first in first out basis and the way such relay information is inserted to the queue is event driven. For a variety of reasons, the queue within the communication device 12 may be filled up very quickly, leading to the delays in relaying the more important relay information. It is therefore advantageous to prioritize more important relay information over other less important relay information to facilitate propagation and transport. For the sake of illustration, a successful delivery notification is deemed higher in priority relative to the normal data content because once a successful delivery notification is received by a communication device, it will delete any copies of successfully delivered relay information. This will reduce the unnecessary forwarding of an already delivered relay content. Data content may include text messages or multimedia content ('media').

Figure 5A:
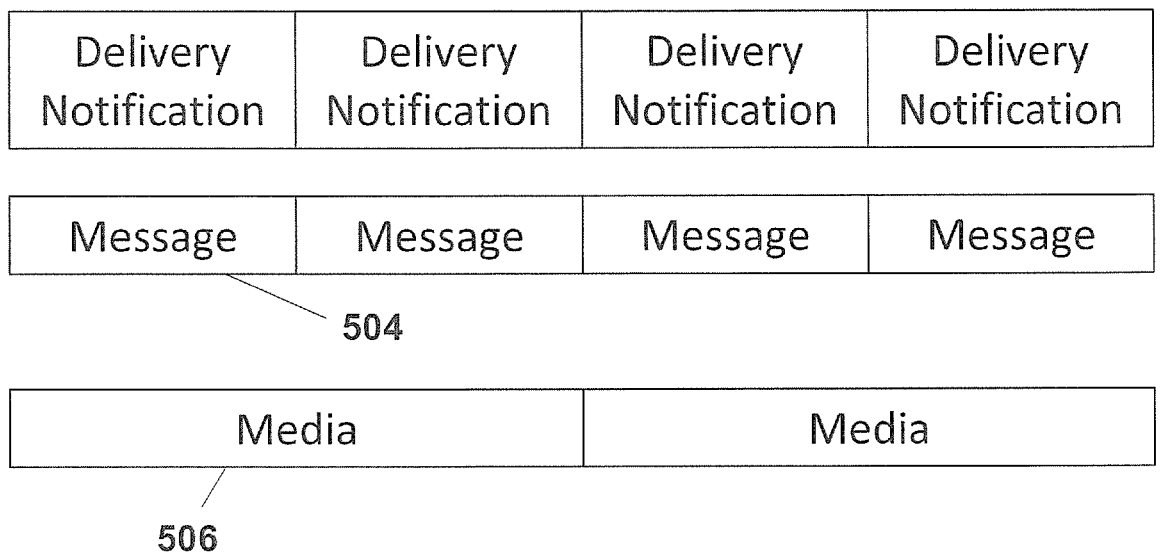
FIGS. 5a and 5b shows different prioritization schemes in relation to relaying different types of information in accordance with some embodiments of the invention.

FIG. 5a shows an example of a prioritization scheme to manage the delivery of relay information. Three groups, in the form of queues 502, 504, 506 are created within the cache. A first queue is used to store delivery notifications (highest priority), a second queue is used to store text-based messages or lower sized data content (intermediate priority) and the third queue is used to store media or higher sized data content (lowest priority).

Figure 5B:
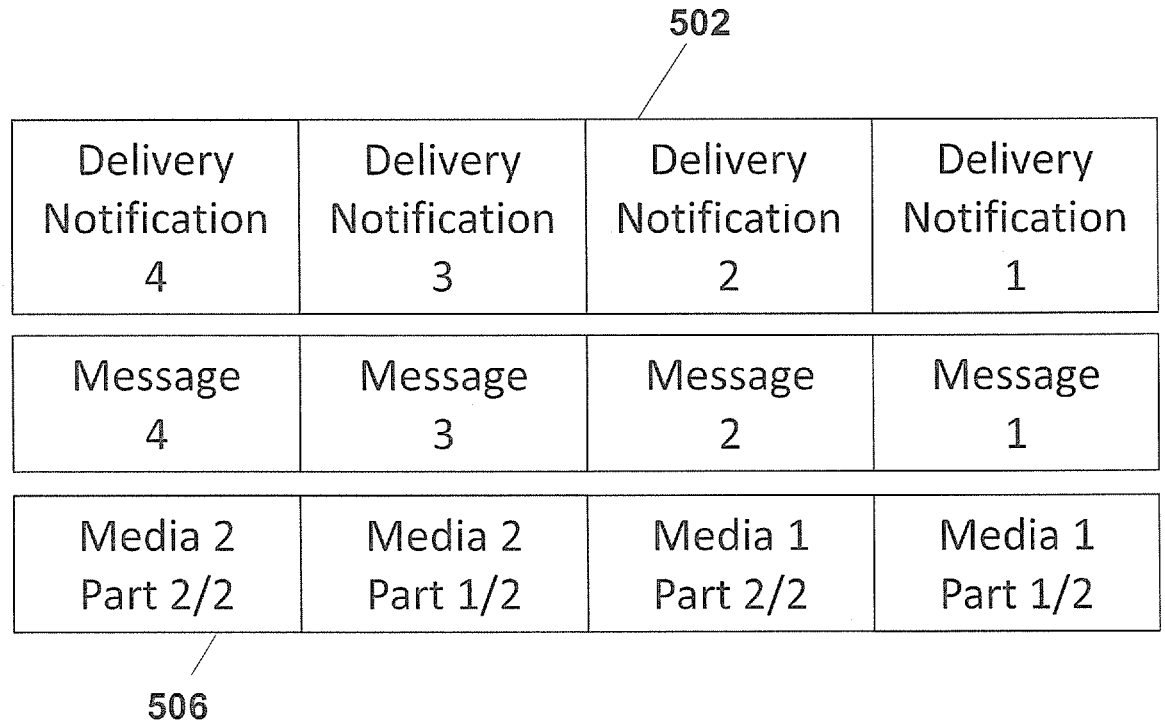

FIG. 5b shows that the media payloads may be broken down or divided into multipart payloads which are somewhat similar to the average size of a text Message or Delivery Notification. This is to ensure that when media payloads are being processed or forwarded to another communication device, it is avoided from becoming a full overhead of delivery notification packets and text Messages.

In an example and with reference to FIG. 5b, the forwarding communication device 12 will try to complete sending all delivery notifications from the delivery queue 502 in a first in first out basis, i.e. Delivery Notification 1, Delivery Notification 2, Delivery Notification 3, and Delivery Notification 4 in that sequence.

Next the forwarding communication device 12 will process Message 1 from the message queue 504, followed by Media 1 part 1 of 2 from the media queue 506. Then it will check if there is a queued delivery notification. If there is it will process any queued delivery notification. Otherwise, it will process Message 2, followed by media 1 part 2 of 2

Then the communication device 12 will check if there are delivery notifications. If there are it will process the delivery notifications. Otherwise it will process message 3, and then media 2 part 1 of 2. The same process will repeat.

The general priority scheme or algorithm is therefore:
a. Send out all Delivery Notification queued in queue 502;
b. Send next text message in queue 504;
c. Send next part of a media message in queue 506.
Loop to Step a.

In embodiments where there comprise multiple communication devices 12 in a mesh network environment, each communication device 12 is operable to connect or 'pair' with a nearby agent prior to sending relay information. Before any 'pairing' takes place, the communication device 12 is operable to discover the following:
  i. capability of nearby communication device (agents) that may be communicating via the same protocol;
  ii. whether these nearby agents around the communication device 12 are already connected;
  iii. How many connections to establish, and if there are a limited number of connections to whom does the communication device 12 connect to so as to maximize the chances of a successful relay (c.f. network scores).
Such discovery process between communication devices 12 typically a. drains electrical (battery) power on the communication device 12 due to continuous scanning for possible connections; and
b. involves the generation of lookout tables detailing active connections between the communication devices 12 which utilize scarce memory resources.

To optimize battery power, each communication device 12 may be configured to scan at every predetermined time interval for a predetermined period of time. A non-exhaustive example is the scanning of nearby agents at every one (1) minute interval for duration of ten (10) seconds. Such an arrangement is optimal to achieve a balance between maximizing discovery of nearby agents and minimizing battery power drain, the two which are conflicting objectives. It is to be appreciated that other intervals or durations achieving the same purpose may be considered.

Figure 6:
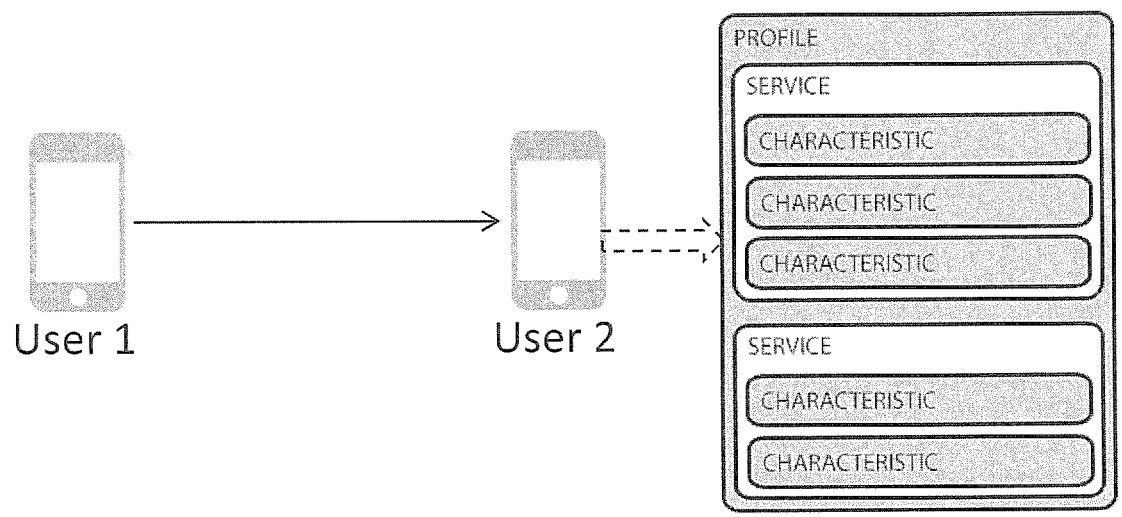
FIG. 6 shows how a communication device used for the relay of information may be adapted to detect and identify another communication device suitable for the relay of information.

Each communication device 12 may be configured to view certain parameters associated with the available communication devices 12 around the vicinity of the same. With reference to FIG. 6, the parameters may be arranged in the form of a 'profile and services' interface.

A user may use a 'Services' parameter to identify whether a nearby communication device 12 has a similar protocol for connection. Then, a 'characteristics' parameter is used to identify the state of the communication device 12 such as the Internet connectivity status, storage space, number of existing connection, version of encryption ciphers, reputation as a forwarding agent etc.

The characteristics parameter can be used to determine if a user A will connect (Listen) to a user B. The characteristics can include parameters such as:
1. Capability of the Agent (network access, battery life, storage)
2. Content (number of pending messages)
3. Identity (Version of software, supported encryption ciphers, reputation as a forwarding agent)

After identification of an agent for the communication device 12 to connect to, the device can then be connected to the agent via pairing. Once paired, a connection is established and the lookup table of active connections is updated for decision making on subsequent scans on Bluetooth LE.

As the number of active connections between one communication device (user A) with other agents (user B, user C etc.) increase, when relaying information (e.g. text message A), user A would have to keep track of the connections it has to send text message A to. The same active connections will have to be used and tracked by user B and user C to send their own messages (text message B and text message C) respectively to user A, or to reply with event related messages in response to previous messages sent by user A.

Figure 7:
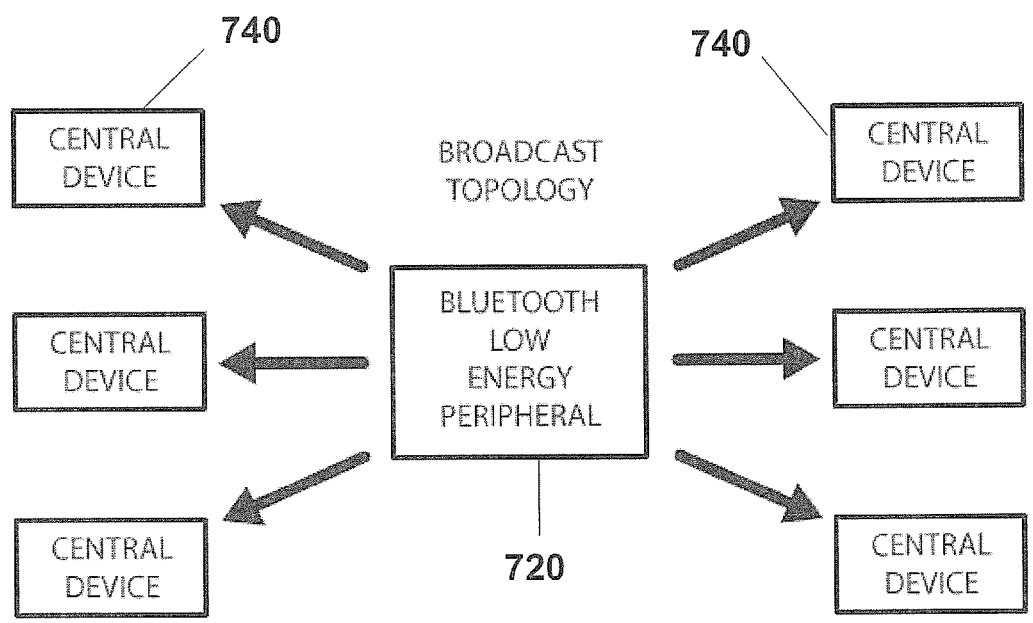
FIG. 7 shows how a communication device used for relay may function in a peripheral device mode or a central device mode in some embodiments.

FIG. 7 shows an embodiment where each communication device 12, utilizing Bluetooth LE as communication protocol, is operable to function two roles, that as a peripheral device 720, and that as a central device 740.

In terms of operation, a communication device 720 functioning as a peripheral device will broadcast or advertise its status to other devices 12, 740 within range. Any communication device 12, 740 within range can connect or pair with it. Using this mode, the peripheral device 720 will broadcast messages and replies to other connected users 12, 740. Therefore implementation is simple to the extent that a user of communication devices 12, 740 will just send the message via the broadcast connection. The user no longer needs to know how many users and which users was able to receive or listen to the message. In other words, no lookout table is required.

In the central device 740 mode, after scanning for nearby agents the central device 740 connect to legitimate agents as a central device 740. In this connection, the central device 740 is operable to listen for messages coming from these agents. The messages which might be received include but are not limited to the following: Messages for the central device 740; Messages for others devices 12, 720, 740; and Delivery Notifications.

As described in earlier embodiments, it is necessary for a communication device 12 to maintain records of relay information. These data can take up valuable memory on the communication device 12 and therefore there is a need to manage the storage by deciding the expiry period or date associated with each type of relay information and whom the relay information is meant for. Advantageously, the management of relay information within each communication device 12 seeks to achieve a finite or computable responsibility in handling forwarded message. The intent is to reduce the time used to store each message and to manage the storage space being used to store forwarded messages.

Figure 8:
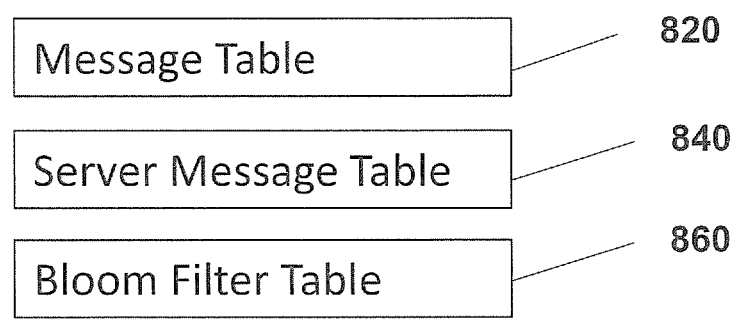
FIG. 8 shows how relay information or data can be organized in a message table, server message table and a bloom filter table according to some embodiments.

An example of how relay information are managed and organized is illustrated in FIG. 8. In FIG. 8, the relay information (message) may be organized into three groups (table) as follows based on the intent and content of the relay information.
a. Message table 820—this table is configured to contain messages related to the communication device 12 (Sent or Intended for the user of that particular communication device). The records in this table are permanently stored until the user manually deletes them from the records via an interface on the App.
b. Server Message Table 840—this table is configured to contain messages that the user of communication device 12 is forwarding on behalf of other people. The messages in this table are deleted when a corresponding delivery notification that the intended recipient has already received the message or if the messages have been sent to up to N unique peers (N may be currently set to 6).
c. Bloom-filter table 860—this table contains a unique identifier associated with the status of the messages. There are 3 bloom-filter records in this table, namely 'delivered', 'in transit', or 'pending' as previously defined.

When a message is received, it is in an encrypted format. The App will decrypt it and determine if it's intended for the specific communication device 12. If the message is intended for the communication device 12, it will then check the message table if the message already resides there. If not, the message will be inserted in the server message table 840, and a delivery notification is sent broadcasted to all nearby listeners. In the event that the message is duplicated and has already been previously received, a delivery notification broadcast is sent to all nearby users. This is to synchronise the delivery status to all other peers/agents within range who have not been informed that the message has already been delivered. Once the peer/agent within range receives the delivery status, their bloom filter table 860 are updated and any raw message will be deleted from their server message table 840.

Once a message is inserted in the message table 820, it is decrypted and not encrypted since these are messages related to the specific communication device 12 and therefore the user of the specific communication device 12 can view the decrypted message. The messages within the server message table 840 and bloom filter table 860 are typically stored in the encrypted form to maintain privacy.

If it is determined that the message is not meant for the communication device 12, the message unique ID will be checked against the 'delivered' bloom filter record. If it is found to be in the 'delivered' bloom filter record, the communication device 12 will send a delivery notification to all nearby peers/agents. If not within the delivered bloom filter record, the communication device 12 will check if the message unique identifier is in the 'in transit' delivery notification. If it is within the 'in transit' record, it will broadcast a delivery notification to all nearby peers/agents. If it is not in either 'delivered' or 'in-transit' bloom filters records then it is safe to assume that this message is received for the first time and a record is created in the Server message Table 840. This message will then be broadcasted from time to time to other agents within range. The bloom filter table will be updated whenever a delivery notification related to the message is received whenever a broadcast takes place.

When a delivery notification in response to a broadcast of a forwarded message is received, the server message table 840 is updated and a counter flag associated with the message is increased for every different agent where the message has been forwarded. The bloom filter records are also updated to include the unique ID of the message in either the 'delivered' or 'in-transit' bloom filter record. After forwarding the message successfully to N unique users (currently set to 6), the raw message is deleted from the Server Message Table 840. The Bloom Filter records are relied upon to handle subsequent encounters with this message and delivery notification related to it. It is to be appreciated that messages within the Server Message table 840 remain encrypted. The Bloom-filter is an elegant way of handling subsequent encounters of the message after the initial copy has been deleted in the Server Message Table 840.

It is advantageous to link the App and server 14 to a social media platform so as to increase exposure or viewership of the relay information. This may make a difference between life and death when a user is in some form of danger, and if an SOS message could be posted on social media platform it may increase the user's chances of survival. In some embodiments, a user of communication device 12 may link his social media account to the server 14 via the App. Using a unique identifier, such as the mobile identification number, mobile verification may be utilized as part of the validation process for linking the social media account to the server 14.

In the linking process, the communication device 12 has to be online, i.e. connected to the server 14 and connected to the social media platform in order to access the authentication protocol that allows users to approve the application to act on their behalf without sharing their password (Oauth). The Client ID, Client Secret and Access token are stored in the server 14 where it is kept secure. In the communication device 12, the user's MIN is the only thing that is stored.

When composing a social media message (post) via the App and server 14, the post will comprise at least the MIN, content of the post and an optional media (photo, audio, or video). The post will be transmitted as if it were a regular relay information until it reaches the sever 14 via one or more communication device which established connection to the server 14. After validating if the post is duplicate or is a new post, the MIN is cross referenced to the Social Media records (access token) if any, and then posted on behalf of the user to the actual Social Media Platform. The following details the salient steps of registration, linking, and posting.

Registration Process

Figure 9A:
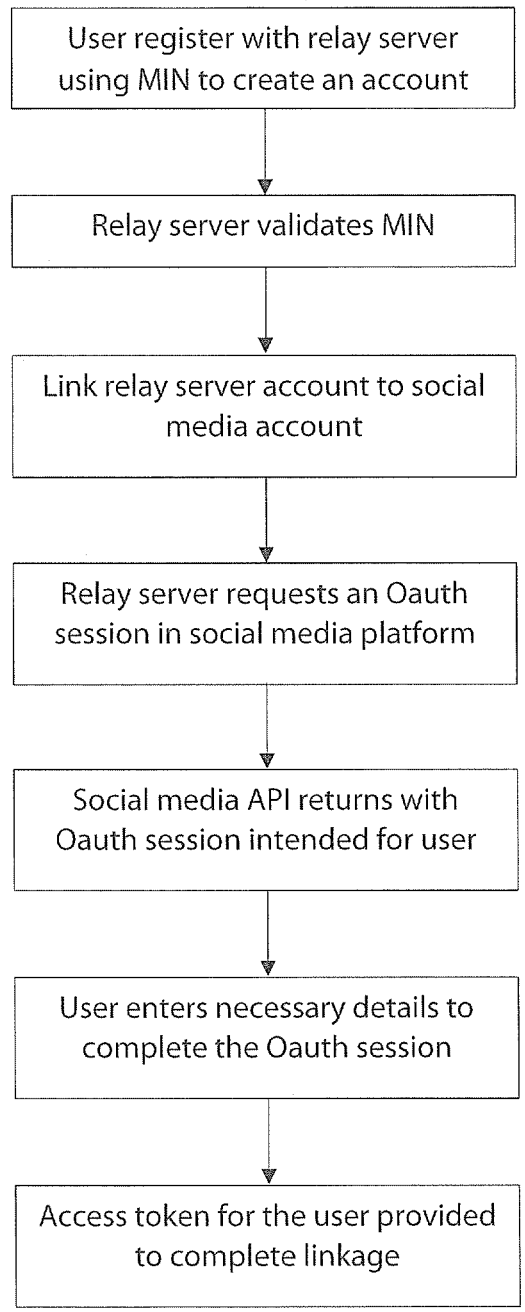
FIGS. 9a and 9b flowcharts depicting how a user utilizes the relay system for a 'peer to peer' relay of information for posting onto a social media platform.
Figure 9B:
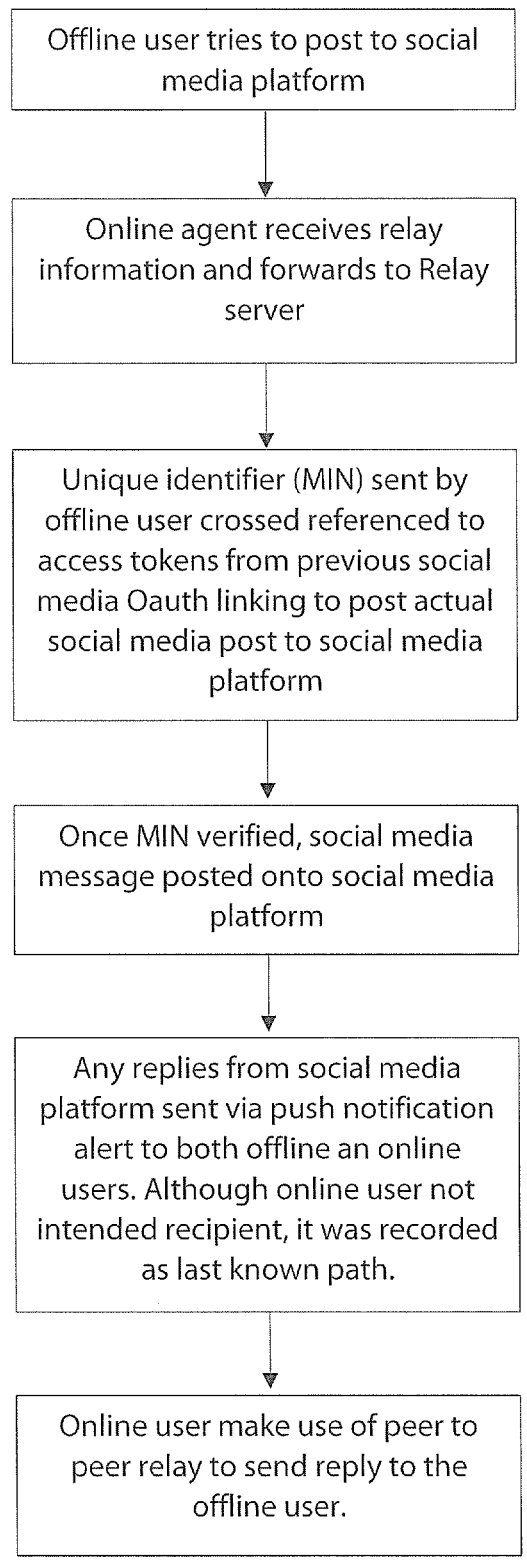
Figure 10:
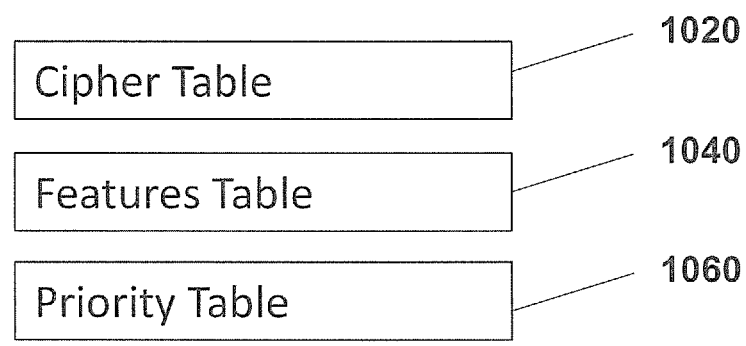
FIG. 10 is an example of a relay server comprising a cipher table, features table, and a priority table.

With reference to FIG. 9a, Registration Process will be described below,
1. A user register with the server 14 using a unique identifier, i.e. his mobile number;
2. The server 14 sends a mobile verification code to the user's communication device 12.
3. The user sends the Mobile Verification Code to the server 14 (cloud service).
4. The cloud service validates the user identity and allows user to download the App in his smartphone.

Linking Process (Using Oauth)
1. The user requests to link his App account to a social media platform
2. The server 14 requests for an Oauth Session in the social media platform
3. The social media platform's API returns an Oauth session intended for the user.
4. The user enters username and password via his installed social media App App or via Web login and is prompted with regards to the permissions being requested by the App.
5. After completion an access token for the user is provided to App's Cloud Service. The social media platform account is then linked to the Mobile Number used for registration with the server 14.

Operation

With reference to FIG. *b*, operation procedure will be described below,
1. An offline user (i.e. user with no direct connection to the Internet and the social media platform) tries to post to the social media via the App. The post request is treated as relay information and is propagated to nearby agents/peers within range via Bluetooth LE.
2. A nearby agent (online) with Bluetooth LE and Wifi/Mobile Data connectivity receives the social media post by the offline user. It forwards it to the server 14.
3. In the server 14, the MIN sent by the offline user is cross referenced to access tokens from a previous FB Oauth linking, and is used to post the actual message in Facebook.

It is to be appreciated that the social media messages between the offline User, online Agent, the App and social media platform are encrypted.

Between the Offline user and Online agent, only the following information may be available: Mobile Number; Message; Media (if any); Date; and Time.

The server 14 is configured to be responsible for detecting duplication of requests and cross referencing of mobile number and social media platform Oauth access tokens.

In the scenario where an online user replies and sends the message meant for the offline user via the server 14; the server 14, via the App, sends a push notification alert to both the offline user and online agent about a pending message event. Although the online agent is not the intended recipient of the message, it was previously recorded as the last known path to offline user.

The online agent receives the encrypted message and forwards it via peer-to-peer communication protocol, i.e. Bluetooth LE, to the offline user.

Apart from the described server message table 840 or bloom filter table 860 which stores relay information in an encrypted form, the server 14 utilizes encryption codes to further enhance the encryption relay messages may be encrypted. In addition, there exists features on the App that are disabled by the server 14 until further credentials such as first responder accreditation (for person finder), or social media Oauth (for social media platform linking) are verified and approved by the server 14. This may be determined when the communication device 12 is first registered with the server 14 and may potentially be implemented via push notification. The verification may include having a whitelist of MINs maintained by the server 14.

In addition, the server 14 maintains a list of priority table for first responders in times of emergencies. Relay information from a first responder will be processed in priority over other normal users. This overrides the prioritization scheme as illustrated in queues 502, 504, 506.

With regards to the encryption codes, there comprises a cipher table 1020 maintained by the App. The cipher table 1020 is an encrypted list of encryption keys to be used by the App when transmitting relay information within its peer to peer network. During Registration/Login or when a connection is established between the communication device 12 and the server 14, the server 14 will trigger the App to update their Cipher Table 1020. In the event where some encryption codes has been deemed to be old and compromised, the server 14 is operable to inform online users logging in or registering to not honor the old/compromised encryption codes and hence prompt the communication device 12 to update the cipher table 1020. Old users who have internet connectivity will receive a push notification request to instruct the app to extract/update/synchronize the new encryption keys from the server 14.

Offline communication devices 12 that do not have a connection with the server 14 will be informed by updated users to go online to update their App to be able to continue to use life messenger if they are using compromised encryption codes.

The App further maintains a features table 1040 which is used as a reference table on how to manage and deal with relay information related to special features (requiring accreditation or authorization to unlock). The table is updated when a user logs in, registers or goes online. A push notification may be sent to the user of the communication device 12 to trigger updates on the feature table 1040.

In the utilization of Bluetooth LE as the communication protocol to relay information between the plurality of communication devices, redundant connections may occur in a number of situations described as follows:

i. when each communication device classified as a group are concurrently connected to every other communication device within the same group;

ii. when an unclassified communication device ("loner") seeks to join a group via one communication device within the group and both the loner and the communication device initiates connection concurrently;

While concurrent connections with as many communication devices as possible increase the certainty that a relay information would be successfully routed or delivered to the intended party, it was discovered that when a communication device is concurrently connected to many communication devices, there may be a drop in performance or in the worst case, the communication device that is concurrently connected to other communication devices may crash and require a reset.

Figure 11:
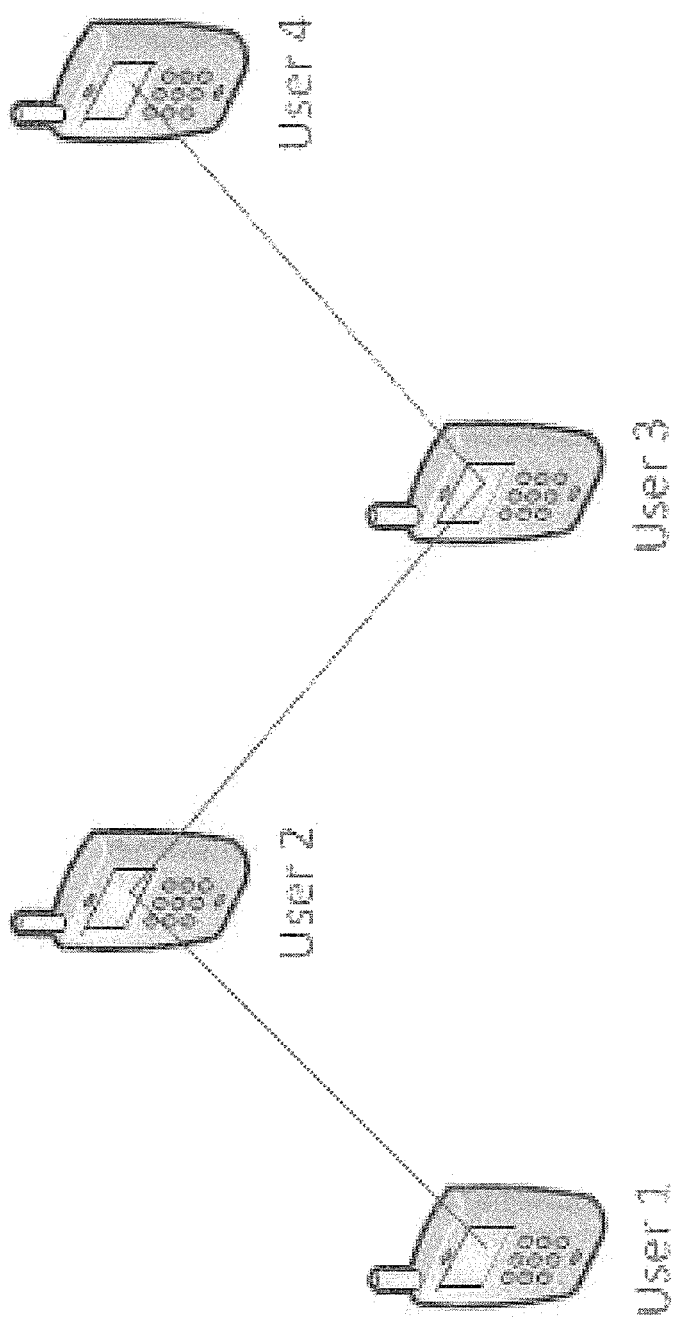
FIG. 11 shows a relay chain comprising of four communication devices or agents in which there are no redundant connections within the network.

To mitigate the above, rules may be introduced to refine the connection algorithm for forming a relay chain of communication devices 12a, 12b, 12c, 12d as shown in FIG. 11. In various embodiments, a wireless signal strength indicator, such as a Bluetooth Signal Strength indicator in the form of a Received Signal Strength Indicator ("RSSI") of neighbouring communication devices or agents may be considered as a factor to be included in the rules. As a rule, the RSSI may be used as a parameter when scanning to prioritize neighbouring communication devices with a stronger/higher RSSI value. The higher the RSSI value implies nearer proximity and more stable connection. The order of the devices and the list of devices can also be filtered to favour communication devices with higher RSSI values.

Figure 12:
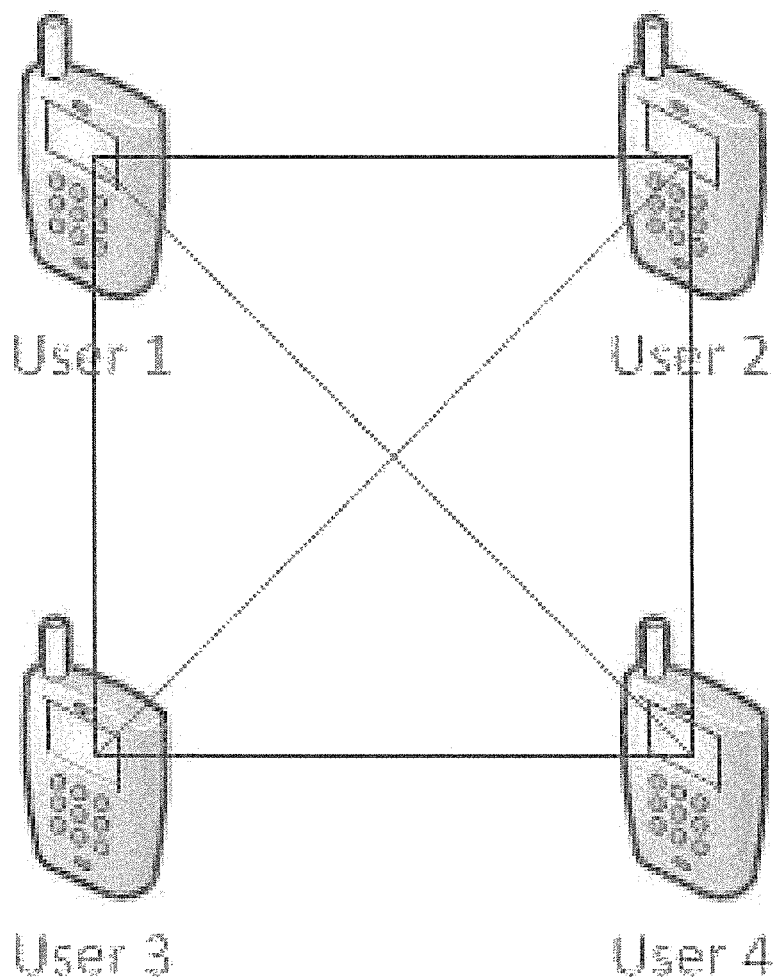
FIG. 12 shows a relay network comprising of four communication devices or agents in which all communication devices or agents are interconnected and redundant connections are present.

In various embodiments, the number of concurrent connections with neighbouring agents for each agent or communication device may be limited or restricted to a predetermined number (e.g. three to five). Advantageously, limiting the number of concurrent connections may prevent unwanted disconnections or shutting down of the phone's Bluetooth Module. In various embodiments, the foregoing limitation on the number of concurrent connections to not go beyond the predetermined number of neighbouring agents may not limit the reach of the overall network because as long as agents are connected in a relay chain or network, directly or through a series of hops via others, then theoretically one agent can reach all others who are agents of that same group for the purpose of transporting data to others as endpoints or as relay points. This is an improvement to the implementation as shown in FIG. 12 which is based on a scattershot broadcast or wide cast to other agents within proximity, with little consideration for how many other communication devices are within reach. In the scattershot broadcast or wide cast approach, every node (which represents a communication device or agent) is connected to all available nodes or agents around them, leading to redundancy in connection.

Figure 13:
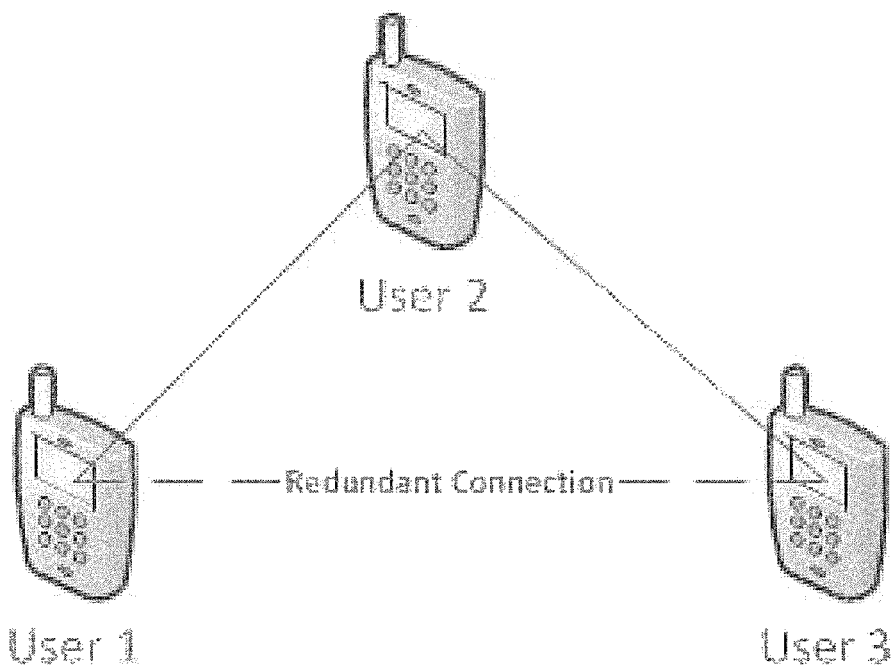
FIG. 13 shows a relay network comprising of three communication devices or agents wherein there is a redundant connection between User 1 and User 3.

Upon limiting the number of concurrent connections, it may be necessary to eliminate redundant or unnecessary connections among other agents. It may be appreciated that the foregoing is necessary for optimizing the reach of the overall network using the least number of concurrent connections for each agent or communication device. In various embodiments, eliminating redundant connections may ensure that there is only one pathway to rely information between two agents in the same group. In a non-limiting example as shown in FIG. 13, since User 1 already has a pathway to User 3 through User 2, a direct connection between User 1 and User 3 is deemed redundant and may be disconnected to allow other communication devices to become part of the Bluetooth LE communication network via User 1 and User 3. Further, User 2 which is already connected to two agents may stop broadcasting ("advertising") if the limit for number of concurrent connections is set to two, so it will not contribute to the scanning events of other agents who still want to create connections. By eradicating the redundant connection between User 1 and User 3, two or more communication devices or agents may be accommodated into the existing group, thus increasing the reach of the overall relay chain even as the number of concurrent connections for each agent or communication device is restricted.

It is to be appreciated that the Introduction of a Group ID, which is determined by a communication device with higher cardinality upon connection is key in detecting redundant connections. Initially all devices are not a member of a group and thus has a Null Group ID. The Agent/Node with the higher cardinality (based on will create generate the Group ID (normally timestamp or epoch). When these devices encounter other Agents those agents without a Group ID are assimilated to the existing Group ID. In case two edge Agents/Node of a Group try to connect to a new Node. Only one of them will be able to assimilate the new Node. The new node upon discovering that the subsequent assimilation attempt belongs to the Group ID, it will treat the later as a redundant connection and disconnect. When two groups with different Group IDs discover each other. The Group with a higher Group ID assimilates the other group.

Figure 14:
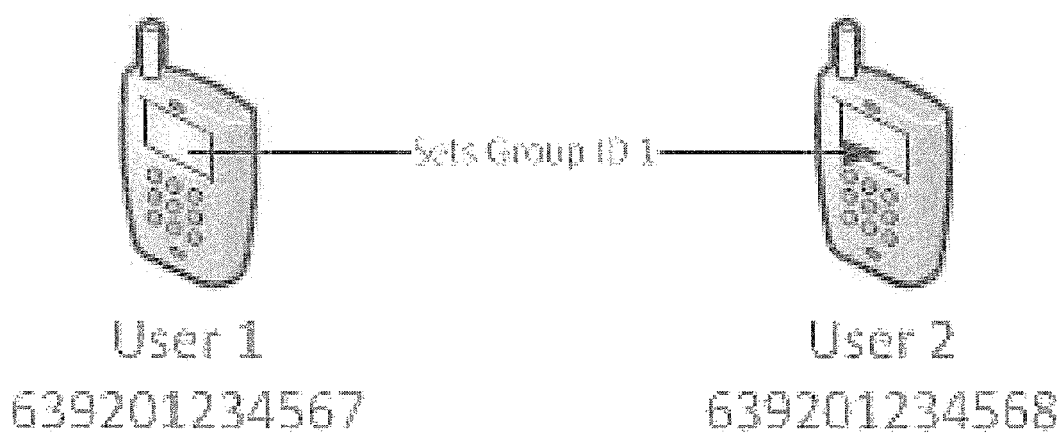
FIG. 14 shows a relay network or group comprising of two communication devices or agents that is formed by a connection between User 1 and User 2, wherein User 2 initiates connection with User 1 due to the First Cardinality Rule.

A non-limiting example illustrating the elimination of redundant connections relates to the situation when two agents attempt to connect to each other at the same time. In this regard, the establishment of connection between the two agents may be limited such that only one agent initiates the connection while the other agent merely acknowledges and allows the connection. An issue with Bluetooth 4.0 is that it may permit two or more separate pathways between two phones. Therefore, when a communication device or agent tries to connect to multiple communication devices this often results in issues of overloading the Bluetooth LE stack with data traffic and events causing the application to crash. In various embodiments as shown in FIG. 14, a rule may be devised to determine or designate one agent (a first agent) which would initiate a connection when two agents (the first agent and a second agent) come into contact with each other. The foregoing rule, also known as the First Cardinality Rule, may be arbitrary in nature and is described as follows: When two agents or nodes (a first agent and a second agent) meet, they exchange a unique identifier such as the MSISDN or the Mobile Numbers. The exchange of the unique identifier may be achieved by sending a message comprising of the unique identifier to the opposite agent. In various embodiments, the unique identifiers that were exchanged may be numerical in nature or have a same format such that a comparison between the two identifiers may be performed. As a non-limiting example, the two identifiers may be compared at either the first agent or the second agent to determine if a condition is satisfied such that the agent with the "higher" or "larger" Mobile Number (639201234568) becomes the party to initiate a connection (the first agent), while the agent with the "lower" or "smaller" Mobile Number, (639201234567) is designated to be the passive party (second agent) and halts all other attempts to establish connectivity with the initiator party (first agent).

In various embodiments, agents that are initially not a member of a group have a Null Group ID. Consequently, the agent/device with the higher cardinality (for example, having a "higher" or "larger" Mobile Number) will create or generate the Group ID (normally based on timestamp or epoch). When these devices encounter other lone agents with no Group IDs, those lone agents are assimilated to the existing Group ID.

Figure 15:
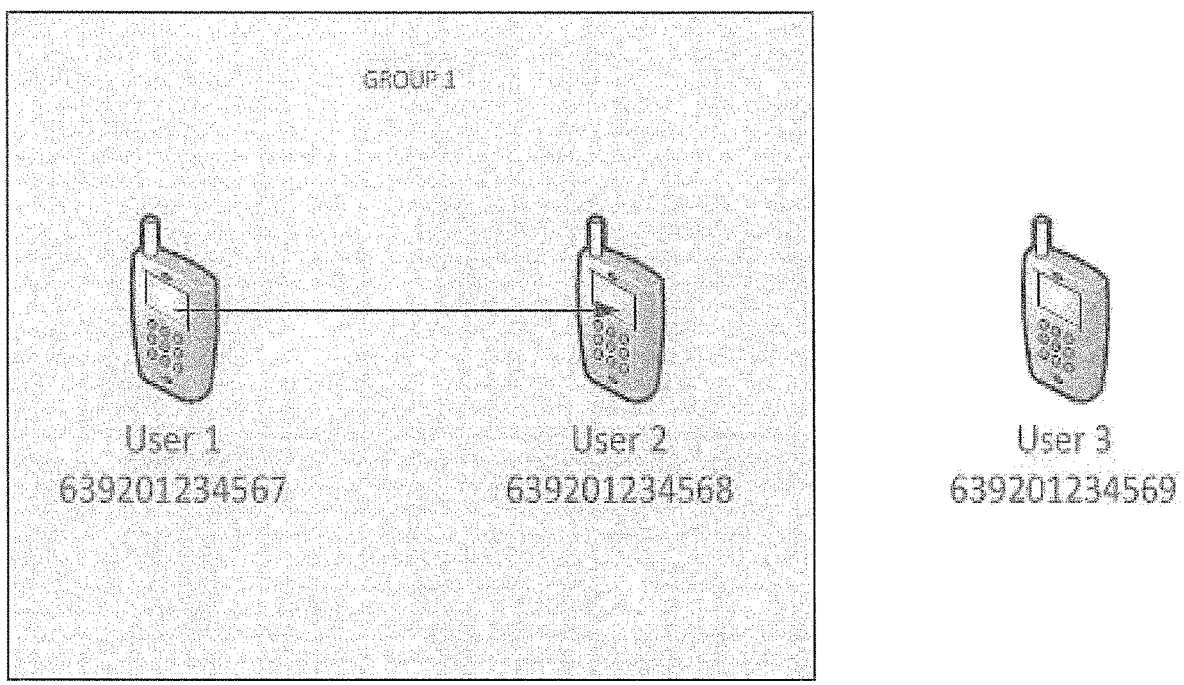
FIG. 15 shows a lone agent (User 3) seeking to be assimilated into a relay network (Group 1) comprising of two communication devices or agents (User 1 and User 2).
Figure 16:
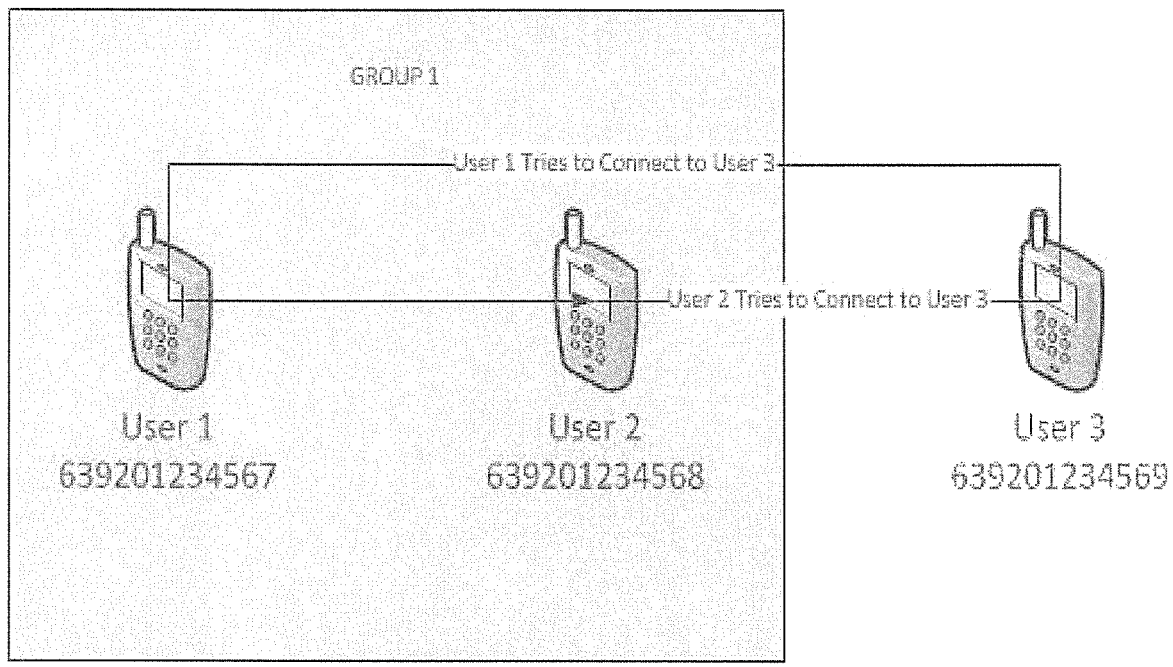
FIG. 16 illustrates the process of assimilating the lone agent User 3 with the relay network comprising of User 1 and User 2 wherein the First and Second Cardinality Rules determine or identify a target agent in Group 1 to receive connection initiated by User 3.

In the embodiment as shown in FIG. 15, agents may be members of an existing Group (User 1 and User 2 part of Group 1) or a lone agent (User 3) which is not part of any existing group. When User 3—determined to be a lone agent—meets another group (Group 1) comprising User 1 and User 2, User 3 may be incorporated into Group 1. As shown in FIG. 16, User 1 and User 2 may simultaneously attempt to connect to User 3; meanwhile User 3 may attempt to connect to User 1 and/or User 2. In various embodiments, before connection, the respective unique identifiers such as MSISDN or Mobile Number may be exchanged between User 3 and User 1 and between User 3 and User 2. In various embodiments, because of the First Cardinality Rule as described above, User 1 and User 2 will become passive while User 3 with the "largest" Mobile Number will be the initiating party. However, as User 1 and User 2 are part of the same group (i.e. have the same group ID), a Second Cardinality Rule may be used to determine or identify one target for User 3 to connect to in Group 1 to prevent any redundant connection. As a non-limiting example, the Second Cardinality Rule may determine the target for User 3 by comparing the unique identifiers or the Mobile Numbers of multiple targets, and selecting or identifying the target with the "higher" or "larger" Mobile Number. In this case, User 2 is identified as the target in which User 3 will establish connection with in Group 1. In various embodiments, User 3 may also connect to both User 1 and User 2 concurrently but the network would identify a redundant connection and disconnect the connection between User 1 and User 3.

In various embodiments, if User 3 has a Mobile Number that lies in between User 1 (lower Mobile Number) and User 2 (higher Mobile Number), the First Cardinality Rule would determine that User 3 has to initiate connection with User 1 and allow connection initiated by User 2. In this scenario, since User 1 and User 2 belong to the same group, the Second Cardinality Rule may further determine that User 3 would only connect with either one of User 1 or User 2. This ensures no redundant connections to be present in the newly formed relay chain.

In various embodiments, it may also be pre-specified that a lone communication device or agent seeking to join a group will always initiate connection with a target in the group, wherein the target is chosen from multiple potential targets in the group that have available bandwidth based on the unique identifier or Mobile Number. For example as shown in FIG. 15, the target is User 2 since it only has one connection and has the "largest" or "highest" Mobile Number within Group 1.

Figure 17:
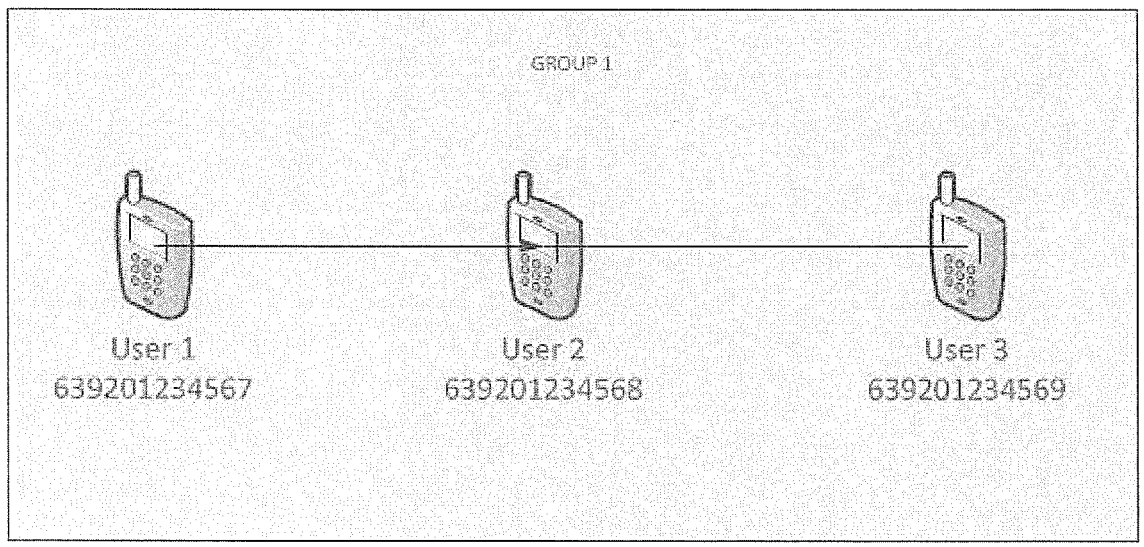
FIG. 17 shows a relay network comprising of three communication devices or agents after the lone agent, User 3, is assimilated into the relay network.

Once the lone agent User 3 is assimilated or integrated into Group 1 as shown in FIG. 17, User 1 and User 3 are located on the edge of the chain and will accept connections since they have the available bandwidth. Meanwhile, User 2 will stop broadcasting or advertising as it has already maxed out the maximum number of connection allowed for an agent. In the scenario depicted in FIG. 17, the predetermined number of connections per agent is set to 2) while the reach and inclusiveness of the Bluetooth network is maximized.

In various embodiments, establishing a new connection between two agents possessing the same Group ID is unnecessary since both agents already have ways by which to reach other, i.e., through other agents. The foregoing redundant connection would lead to more than one pathways between two unique agents. Instead, available connection capacity or bandwidth (such as 3-5 allowable connections) may be used to find lone agents or other agents not yet known to their Group. Further, it may be appreciated in the previous example that User 3 is a lone agent before it is assimilated into Group 1. Hence, User 3 has no connection with any other agents and there would not be any additional redundant connection between User 3 and Group 1 to account for. However, the same is not true when agents from two groups attempt to combine as will be described in the following.

Figure 18:
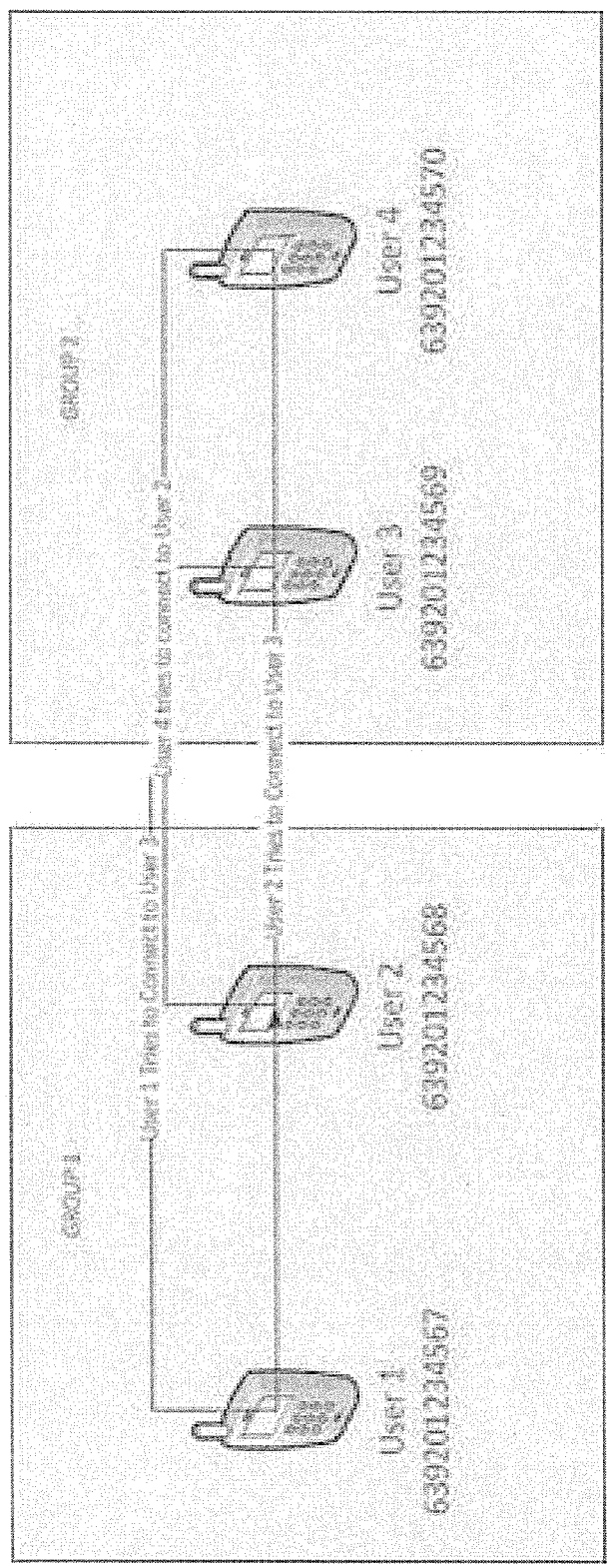
FIG. 18 shows the process of assimilating a first relay network (Group 1), with a second relay network (Group 2). The set of Cardinality Rules identifies a target agent in Group 1 and an initiator agent in Group 2 to establish a connection between Group 1 and Group 2.

In various embodiments as shown in FIG. 18, when agents with different Group IDs meet, it may be determined that users or agents of their respective groups have no agent-to-agent means of reaching each other through a BLE chain. Hence, a connection between at least one agent from each group must be established. All other agents must be notified as such, thus preserving connection limit per agent should members of the larger group meet. In various embodiments, the agents in each group will try to connect to agents in the opposite group while obeying the set of Cardinality Rules. As a non-limiting example, a Third Cardinality Rule may be used to compare the Group ID or Group identifier to determine that the Group with the "higher" or "larger" ID will become the initiator group while the Group with the "lower" or "smaller" ID will become the passive group.

Figure 19:
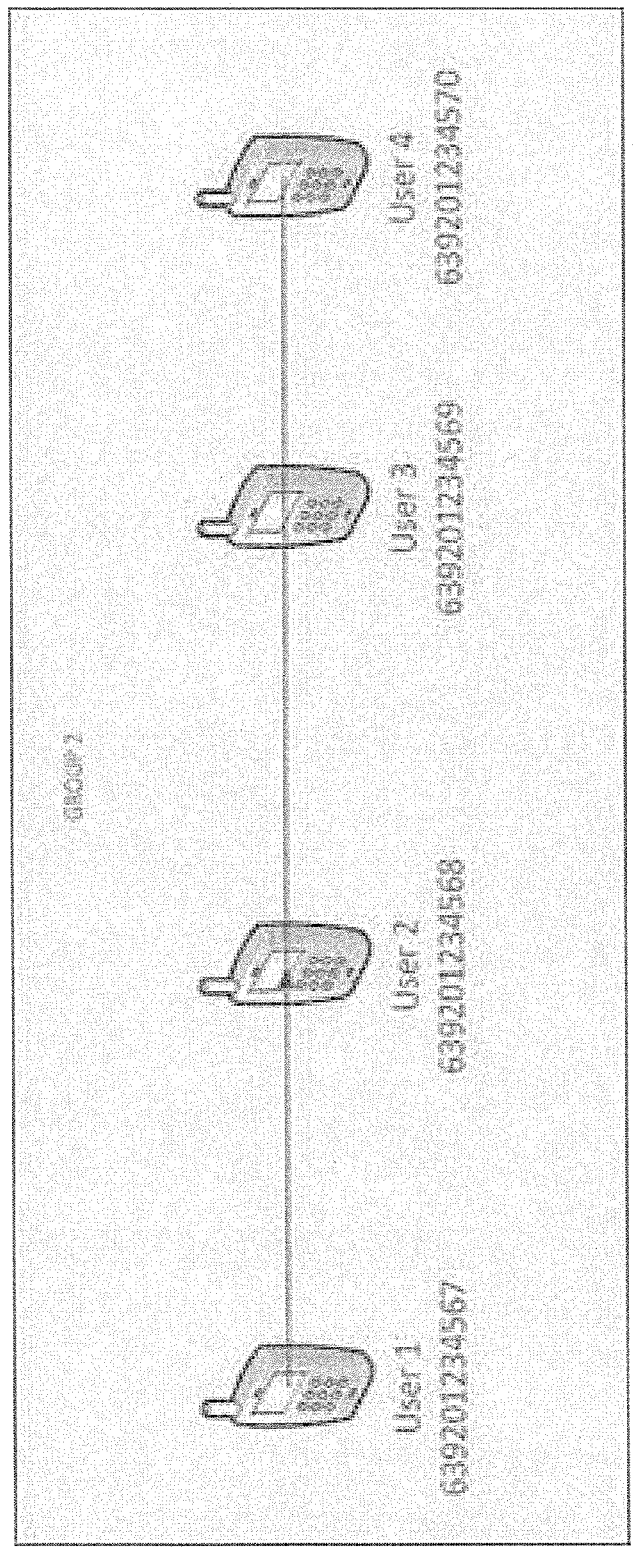
FIG. 19 shows a relay network comprising of four communication devices after Group 1 has been integrated with Group 2; the Fifth Cardinality Rule determines that the Group ID to be "Group 2".

Thereafter, the first and Second Cardinality Rule may be used to identify one target in the passive group. However, there may also be a need to identify one initiator since the initiator group may have more than one agents. In this case, a Fourth Cardinality Rule may be applied such that the target agent would accept connection with the agent that has the "smallest" or "lowest" MSISDN or Mobile Number. This is illustrated in FIG. 18 and FIG. 19 in which firstly User 1 and User 2 in Group 1 are identified to be the passive targets while User 3 and User 4 are identified to be the initiators (Fourth Cardinality Rule). Then, both User 3 and User 4 would identify User 2 as the target by virtue of the Second Cardinality Rule which states that the initiator would connect to the target agent with the "largest" Mobile Number or unique identifier if there are more than one potential targets with the same Group ID. Thereafter to eradicate any redundant connections between Group 1 and Group 2, the Fourth Cardinality rule may be triggered to allow User 2 to only accept connection from User 3 if more than one connections from agents with the same Group ID are received. Consequently, the First, Second, Third and Fourth Cardinality Rules assimilate two groups while maintaining a chain of connections free from redundant connections such that there is only one single pathway between two unique agents in the relay chain.

In various embodiments, a target within Group 1 and initiator within Group 2 may be identified by comparing the Mobile Numbers within their respective group after initiator group and the passive group is designated. For example, User 3 is identified as the initiator in Group 2 as it has the "smallest" Mobile Number in Group 2 and User 2 is identified as the target in Group 1 because it has the "largest" Mobile Number in Group 1. Further, both User 3 and User 2 have available bandwidth for additional connection.

In various embodiments, Group IDs may be made uniform for the newly formed group. In various embodiments, a Fifth Cardinality Rule may be used to determine which Group ID is preserved and which one is eliminated. For example, Group IDs may consist of numbers, and the algorithm may determine that the group with the higher Group ID number becomes the surviving Group ID Hence, both are free to use their "Group ID" to reduce redundant connection in a chain network topology to maximize the number of agents that may be reached. In the Group ID setup, it may be detected by an algorithm if the agents or agents are already connected in their current network by using their Group ID. If they have the same Group ID the connection is determined redundant and is disconnected to allow others to connect to the network. In the event that the two nodes or agents do not have the same Group ID, a connection may be established. As described above, the agents or nodes on the other group with the lower Group ID adopts the Group ID of the other agent or node with higher Group ID (Second Cardinality Rule). It may be appreciated that the Cardinality Rules as described above may be arbitrary and each Cardinality Rule may comprise a Boolean logic that compares two identifiers based on a pre-determined condition to return an outcome based on whether the pre-determined condition is satisfied. Although the Cardinality Rules are described above in the context of comparing Mobile Numbers and Group IDs, it may be appreciated that other identifiers or performance or connectivity metrics (such as Bluetooth RSSI or Network Score) may also be compared. In various embodiments, the performance metrics or connectivity metrics may be further used for prioritizing connections to a particular agent. In various embodiments, the maximum number of concurrent connections or the connectivity capacity for an agent within the network may be increased relative to the other agents within the same network if the agent is determined to have a higher performance and/or stability as indicated by the performance metrics such as network scores or connectivity metric such as Bluetooth RSSI. Hence, the maximum predetermined number of concurrent connections for each communication device may be different and dependent on a performance metric or a connectivity metric of each communication device.

It may be appreciated that by 1) obeying at least the rules as described above to eliminate redundant connections between two agents and within a group and by 2) restricting the maximum number of concurrent connections per agent to two, a linear relay chain will be formed and new agents or a second linear relay chain may be integrated via the agents located at the side of the linear relay chain. By increasing the maximum number of concurrent connections per agent above two while ensuring that redundant connections are eliminated across the network such that there is only a single path between two different agents, it may be appreciated that a relay tree, instead of a linear relay chain, may be formed such that any new branches of relay chains would not be looped back to the existing relay tree to prevent the situation in which there will be two paths to relay information between two different agents in the relay tree. The agents in which branching occurs may be driven at least by network scores or Bluetooth RSSI.

The discussion above concerns mostly about creating Groups, stabilizing the connections among members (e.g., through limiting the maximum number of concurrent connections per agent). In various embodiments, the actual transmission or relaying of data or packages or messages or payloads require proper Routing Algorithms and similar processes. It is important to note this distinction—between the establishment of Groups and the actual transmission of data among the members of those Groups. For proper routing, known Routing algorithms may be employed, especially those that deal mostly with low-power wireless connectivity, such as for example Ad hoc On-Demand Distance Vector (AODV), Destination-Sequenced Distance Vector routing (DSDV). In various embodiments, a linear Routing Algorithm may be used such that Agent A knows how to reach another agent in the same Group through the use of a Routing Table or lookup table that tells Agent A if Agent C is either on its "Left Side" or "Right Side" of the relay chain. The agent adjacent to Agent A then use the Routing Table in a similar manner to determine if the direction in which the content should be propagated. In this manner, the target recipient agent may be reached after several repetitions.

It is to be appreciated by a skilled person that the system 10 may be applied to other applications such as but not limited to:—

Missing People Services, such as Google's Person Finder (requiring verification of 'first responder' status to unlock). First Responders and volunteers provide information on missing people in the form of "I have info on someone" forms. Such relay information may be in the form of photos, locations tags—for uploading to the Google's Person Finder servers. (Data gathered by people who have just come from a disaster site, get assigned higher Network Scores or packages collected from the site, get flagged Urgent.)

Relay information in the form of offline actions on social networks like Facebook™ and Twitter™, such offline actions include posting statuses, sending direct messages, liking posts, accepting friend requests, replying to mentions, etc.

Relay information in the form of batched sending and receiving of email messages. Instead of requiring direct connectivity to the Internet, the relay chain or system as described may be used to propagate email messages through the system until some of the system subscribers are able to connect to the server 14, and pass on the email messages.

Tracking missing items using IOTs (Internet of Things). Most of these gadgets are configured to give out the relay information in the form of real time status of the items they are attached to; their location or whether they could possibly be missing. Powered by the relay chain system, such gadgets (having transmitter, receiver etc.) can then communicate with communication devices nearby, and their location information collected. If the tracker devices happen to be reported as missing or the owners simply wants to know where they are, then so will they be informed when some of the users are able to upload information to the cloud servers 14 or reach the owners via a relay chain.

Communication devices 12 in the form of electronic beacons and SOS transponder devices capable of store-and-forward relaying of electronic information via the system. These SOS transponder devices will be installed in places typically not covered by cellular signals, such as hiking trails, mountaineering routes, and other remote exploration areas.

Offline retailing of digital goods, such as passkeys and prepaid airtime credit. The emerging markets have popularized the retail sales of low denomination prepaid credits, e.g., $0.25 to $1.00 per pop. Credits are dispensed via electronic means, such as mobile phones or dedicated in-store terminals. All of which require some form of realtime connectivity, through the Internet, leased lines, text, PSTN dial up, etc. With the Pony Express technology, it is possible to dispense relay information in the form of passkeys without real time server connection. Passkeys are held in electronic caches. As passkeys are sold, detailed information of the sale are passed on the relay network until it reaches the main dealer that synchronizes with the server 14 and reconciles sales versus inventory.

It may be appreciated that in the relay network which may be a liner relay chain or a relay tree, individuals nodes in the relay network may be interchangeably refer to as agents, communication devices or nodes.

The above is a description of embodiments of systems and methods for relaying information. It is envisioned that those skilled in the art can design alternative embodiments of this invention that falls within the scope of the invention. In particular, it is to be appreciated that features from various embodiment(s) may be combined to form one or more additional embodiments.

The invention claimed is:

1. A system for non-real-time delivery of relay information to a target destination device through a series of real-time exchanges of the relay information, comprising:
    (a) a source device configured to compose the relay information and select the target destination device, wherein a conventional real-time network coverage transmission link to the target destination is not reliable or not available;
    (b) a plurality of communication devices, each communication device having means to synchronize the relay information in a first real-time exchange from the source device, a cache to store the relay information synchronized from the source device, and means to transmit the relay information in a second real-time exchange to either the target destination device or at least one other communication device,
        (i) wherein the relay information is tagged based on one of a pending status, an in transit status, and a delivered status;
        (ii) wherein the pending status indicates the relay information resides on the source device and has not yet been transmitted to any communication device;
        (iii) wherein the in transit status indicates the relay information has been synchronized into the cache of at least one communication device;
        (iv) wherein the delivered status indicates the relay information has been delivered to the target destination device; and
        (v) wherein each communication device is further assigned a network score; and
    (c) a server operable to update the network score assigned to each communication device when a connection between the communication device and the server is established,
        (i) wherein the network score for each communication device is a measure of the reliability and effectiveness of the communication device in relaying information relative to the target destination device or other communication devices:
        (ii) wherein where a connection between the communication device and the server is not established, the communication device is configured to update its network score; and
        (iii) wherein at least one of the plurality of communication devices maintains a set of different network scores for multiple scenarios.

2. The system according to claim 1, wherein the server is in data communication with at least one database to store the network score assigned to each communication device.

3. The system according to claim 1, wherein the network score of the communication device is updated based on one or more of the following data analytics: a quantitative measure; a heuristic measure; a predictive method; and a prescriptive method.

4. The system according to claim 3, wherein the data analytics include big data analytics.

5. The system according to claim 1, wherein at least one communication device is a mobile device.

6. The system according to claim 5, wherein the means to transmit, receive and store relay information comprises wireless personal area network (WPAN) technology.

7. The system according to claim 6, wherein the WPAN technology is Bluetooth LE or Wi-Fi Aware.

8. The system according to claim 1, wherein the network score is assigned or updated based on a combination of two or more of a factor associated with a hardware capability of the communication device; a factor associated with the environment of the communication device; and a factor associated with the network score of at least one other communication devices within a proximity.

9. The system according to claim 8, wherein the combination of factors include two or more of the following factors: frequency of connection between the communication device and the server; success rate in being part of a relay chain to deliver relay information; size of the buffer holding information in transition; average network scores of other communication devices within a proximity of the communication device.

10. The system according to claim 1, wherein the server is operable to relay the information to at least one communication device.

11. The system according to claim 1, wherein where there comprises a plurality of other communication devices ready to receive relay information, the communication device is configured to relay information to the other communication device having a highest network score.

12. The system according to claim 11, wherein where there comprises a plurality of communication devices ready to transmit relay information, the other communication device is configured to receive information from the communication device having the highest network score.

13. The system according to claim 1, wherein each communication device is configured to relay information to a plurality of other communication devices regardless of network score of the plurality of other communication devices.

14. The system according to claim 1, wherein the plurality of communication devices are grouped into a plurality of different channels based on their respective network scores.

15. The system according to claim 14, wherein the plurality of different channels comprise Bluetooth LE channels and Wi-Fi channels.

16. The system according to claim 14, wherein there comprises a communication device selected from amongst the plurality of communication devices to facilitate grouping.

17. The system according to claim 16, wherein the communication device selected to facilitate grouping has most quality connections, or has a highest visibility of the other communication devices within a predetermined region.

18. The system according to claim 1, wherein when a connection between the server and a communication device is established, the communication device is configured as a proxy for other communication devices to establish connection to the server and to other communication devices in the same wireless LAN.

19. The system according to claim 18, wherein the communication device provides necessary details for the other communication devices to connect to the server through said communication device.

20. The system according to claim 1, wherein a new communication device joining the system is assigned a default network score.

* * * * *